(12) United States Patent
Kurita

(10) Patent No.: US 7,275,963 B2
(45) Date of Patent: Oct. 2, 2007

(54) STORAGE MEDIUM LOADING MECHANISM AND STORAGE MEDIUM DRIVE UNIT

(75) Inventor: Kazuhito Kurita, Kanagawa (JP)

(73) Assignee: Sony Corporation, Tokyo (JP)

( * ) Notice: Subject to any disclaimer, the term of this patent is extended or adjusted under 35 U.S.C. 154(b) by 520 days.

(21) Appl. No.: 10/468,822

(22) PCT Filed: Dec. 25, 2002

(86) PCT No.: PCT/JP02/13514

§ 371 (c)(1),
(2), (4) Date: Feb. 12, 2004

(87) PCT Pub. No.: WO03/058547

PCT Pub. Date: Jul. 17, 2003

(65) Prior Publication Data

US 2004/0133726 A1    Jul. 8, 2004

(30) Foreign Application Priority Data

Dec. 28, 2001   (JP)   ............................. 2001-399163

(51) Int. Cl.
*H01R 24/00*   (2006.01)

(52) U.S. Cl. ..................................... 439/630; 439/328
(58) Field of Classification Search ............... 439/630, 439/638, 159, 357, 247, 248, 328
See application file for complete search history.

(56) References Cited

FOREIGN PATENT DOCUMENTS

| JP | 002269/1993 | 1/1993 |
|----|-------------|--------|
| JP | 2269/1993   | 1/1993 |
| JP | 2000-348798 | 12/2000 |
| JP | 2001-326028 | 11/2001 |

*Primary Examiner*—Javaid H. Nasri
(74) *Attorney, Agent, or Firm*—Oblon, Spivak, McClelland, Maier & Neustadt, P.C.

(57) ABSTRACT

A loading device for a platelike storage medium incorporating a semiconductor memory and having at least a plurality of terminals, including a terminal portion having a plurality of connection terminals adapted to be connected to the terminals of the storage medium, the terminal portion being movable in a direction so that the terminals of the storage medium come into connection with the connection terminals of the terminal portion in loading the storage medium; and a leading portion for leading the storage medium and the terminal portion in the direction so that the terminals of the storage medium come into connection with the connection terminals of the terminal portion in loading the storage medium.

19 Claims, 37 Drawing Sheets

US 7,275,963 B2

STORAGE MEDIUM LOADING MECHANISM AND STORAGE MEDIUM DRIVE UNIT

TECHNICAL FIELD

The present invention relates to a storage medium loading mechanism and a storage medium drive unit, and more particularly to a loading mechanism for loading a platelike storage medium having a semiconductor memory and a plurality of terminal electrodes and also to a storage medium drive unit having the loading mechanism.

BACKGROUND ART

Conventionally known is a storage medium drive unit having a slot for insertion of a platelike storage medium having a semiconductor memory and a plurality of terminal electrodes, wherein when the storage medium is inserted into the slot and mounted in a storage medium mounting portion provided inside the slot, data reading and/or writing from/to the storage medium is performed. At present, various storage media having different sizes are provided as the platelike storage medium.

Some of these storage media have common terminal electrodes so that they can be inserted into the slot of the same storage medium drive unit for data reading and/or writing. However, these storage media having common terminal electrodes yet have different sizes, that is, they are different in length, width, and thickness. As means for using the slot commonly for the storage media different in size, an adapter is mounted to the storage medium having a smaller size to allow the insertion of this storage medium into the slot, thus allowing the use of any storage media having common terminal electrodes.

In this case where the adapter is used to allow the common use of the slot for the storage media having different sizes, however, there is a problem that every time the storage medium having a smaller size is inserted into the slot to perform data reading and/or writing, the adapter must be mounted to this storage medium, so that the usability is reduced.

As another means for using the slot commonly for the storage media different in size, it is consider to fix connection terminals adapted to be connected to the terminal electrodes of each storage medium inside the slot, provide a plurality of guides respectively corresponding to the storage media having different sizes inside the slot, detect the storage medium inserted into the slot, and select a suitable one of the guides according to the result of this detection. However, this means requires a complicated mechanism to result in an increase in manufacturing cost of the storage medium drive unit.

It is accordingly an object of the present invention to provide a storage medium loading mechanism and a storage medium drive unit which can ensure simplification of the mechanism and can improve the usability.

DISCLOSURE OF INVENTION

According to the present invention, there are provided a storage medium loading mechanism and a storage medium drive unit. The loading mechanism is provided by a loading device for a platelike storage medium incorporating a semiconductor memory and having at least a plurality of terminals, including a terminal portion having a plurality of connection terminals adapted to be connected to the terminals of the storage medium, the terminal portion being movable in a direction so that the terminals of the storage medium come into connection with the connection terminals of the terminal portion in loading the storage medium, and a leading portion for leading the storage medium and the terminal portion in the direction so that the terminals of the storage medium come into connection with the connection terminals of the terminal portion in loading the storage medium.

In the loading mechanism and the storage medium drive unit having the above configuration, the connection terminals of the terminal portion are led in such a direction as to approach the terminals of the storage medium when the storage medium is inserted into a holder of the loading mechanism.

BEST MODE FOR CARRYING OUT THE INVENTION

A preferred embodiment of the storage medium loading mechanism and the storage medium drive unit according to the present invention will now be described with reference to the attached drawings.

First, a platelike storage medium adapted to be inserted into a slot formed in the storage medium drive unit for data reading/writing will be described (see FIGS. 1 to 5).

Figure 1:
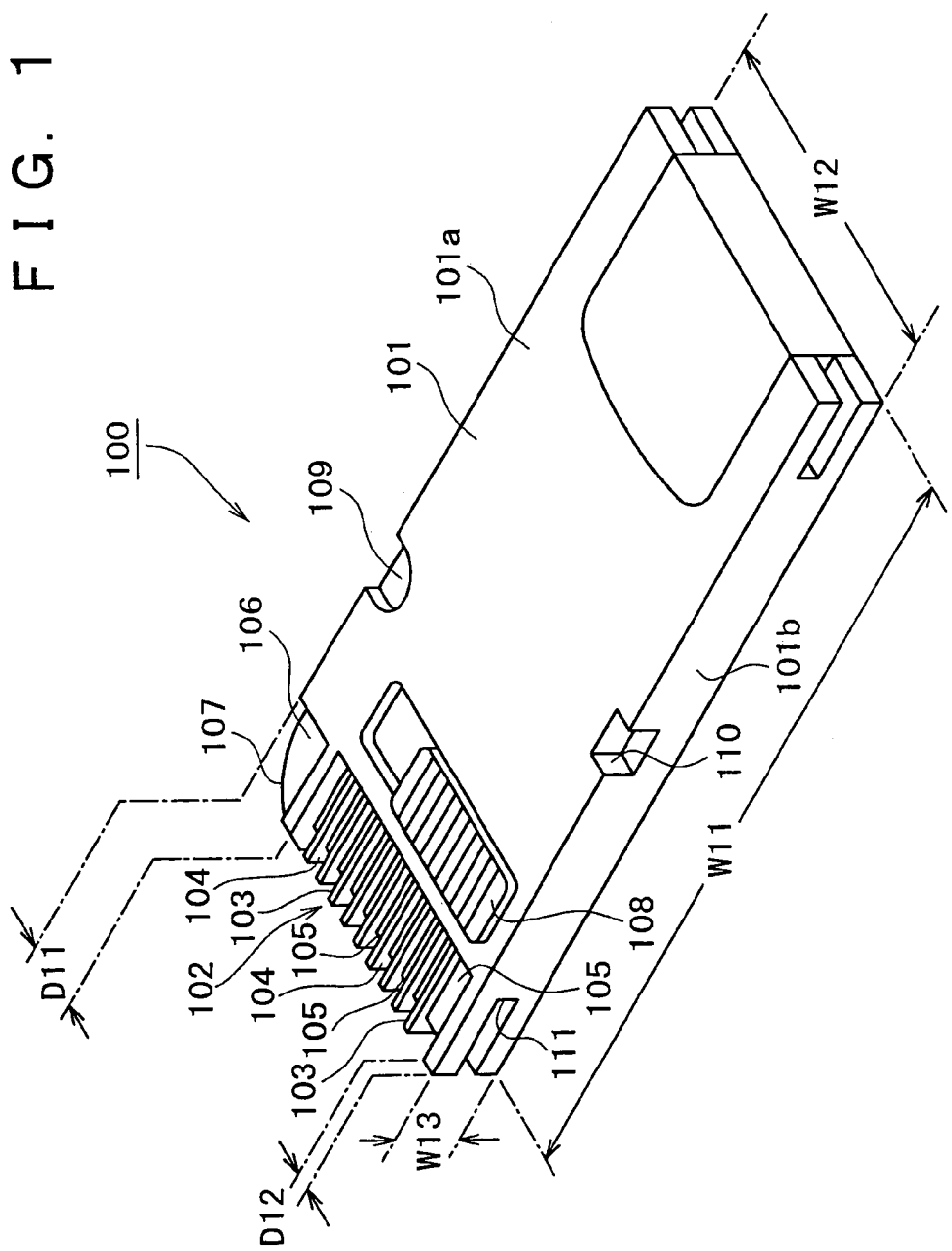
FIG. 1 is an enlarged perspective view showing a first storage medium adapted to be loaded into a storage medium drive unit according to a preferred embodiment of the present invention.
Figure 2:
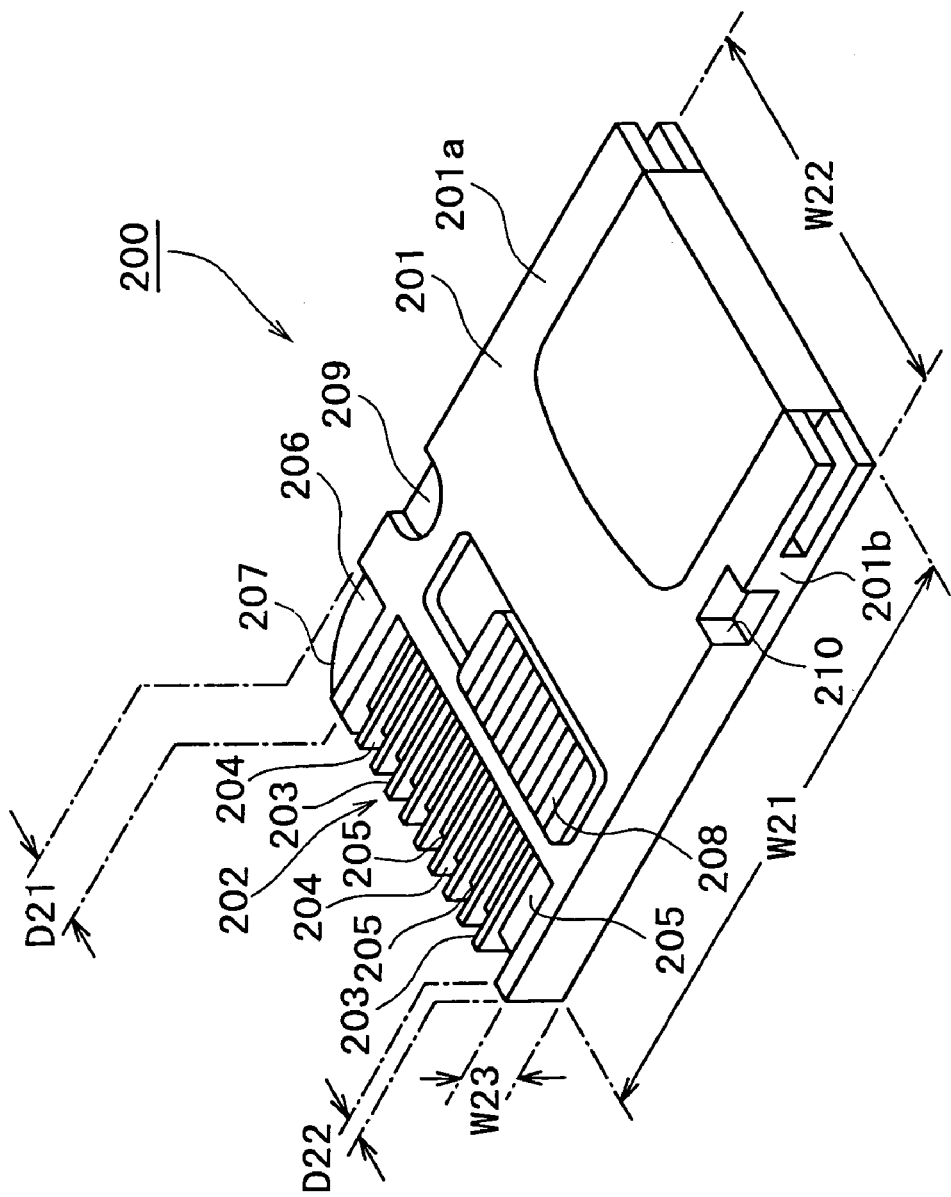
FIG. 2 is an enlarged perspective view showing a second storage medium adapted to be loaded into the storage medium drive unit.

Two kinds of storage media different in size, that is, a platelike first storage medium 100 and a platelike second storage medium 200 are used for the storage medium drive unit (see FIGS. 1 and 2).

The first storage medium 100 is substantially rectangular in shape and has a length W11 of 50 mm, a width W12 of 21.5 mm, and a thickness W13 of 2.8 mm, for example (see FIG. 1).

The first storage medium 100 has a housing 101 incorporating a semiconductor memory such as a flash memory. The housing 101 has a first principal surface 101a having a maximum area and a second principal surface (not shown) opposite to the first principal surface 101a.

An electrode portion 102 is provided at one end portion of the first principal surface 101a in its longitudinal direction (in the direction along the length W11). The electrode portion 102 is formed with a plurality of (e.g., ten) connection recesses 104 by a plurality of partition walls 103 arranged at equal intervals in the lateral direction of the first principal surface 101a (in the direction along the width W12). These connection recesses 104 open to one end (rear end) of the first principal surface 101a in its longitudinal direction and also open to one side (upper side) of the first storage medium 100 in its vertical direction (in the direction along the thickness W13). A plurality of terminal electrodes 105 are provided in the connection recesses 104, respectively.

Another recess 106 is formed on the first principal surface 101a at a corner adjacent to the electrode portion 102 so as to open to the upper side. The outer edge of the recess 106 is rounded to form a substantially arcuate chamfered portion 107.

When the first storage medium 100 is properly inserted into the slot of the storage medium drive unit to be hereinafter described, the recess 106 and the chamfered portion 107 function as a relief from an improper insertion preventing portion provided in the slot, thereby allowing proper insertion of the first storage medium 100 into the slot. In the event that the first storage medium 100 is improperly inserted into the slot in such a manner that the first storage medium 100 is turned upside down or it is inserted reversely in the longitudinal direction, the other corner of the housing 101 at its rear end where the recess 106 and the chamfered portion 107 are not formed comes into contact with the improper insertion preventing portion to hinder the insertion of the first storage medium 100 into the slot, thereby preventing improper insertion of the first storage medium 100.

An improper recording preventing tab (write-protect tab) 108 is slidably provided in the vicinity of the electrode portion 102 on the first principal surface 101a. The improper recording preventing tab 108 has a function such that when it is slid to one limited position, data writing to the semiconductor memory is permitted, whereas when slid to another limited position, data writing to the semiconductor memory is inhibited.

A fall preventing recess 109 is formed on the first principal surface 101a of the housing 101 on the right side thereof at a position near the improper recording preventing tab 108. The fall preventing recess 109 functions to prevent the first storage medium 100 from falling out of the slot by the engagement of the recess 109 with a fall preventing portion provided in the slot when inserting the first storage medium 100 into the slot.

An engagement recess 110 is formed on the first principal surface 101a on the side opposite to the fall preventing recess 109. The engagement recess 110 is formed at a substantially central position in the longitudinal direction of the first storage medium 100. The engagement recess 110 is adapted to engage with an engagement projection provided in the slot, thereby detecting proper insertion of the first storage medium 100 into the slot.

An engagement groove 111 is formed on a side surface 101b of the housing 101 where the engagement recess 110 is exposed. The engagement groove 111 is formed aside the electrode portion 101 so as to open to the rear end of the housing 101. The engagement groove 111 is adapted to engage with an engagement projection provided in the slot to be hereinafter described.

The second storage medium 200 is also substantially rectangular in shape and has a length W21 of 31 mm, a width W22 of 20 mm, and a thickness W23 of 1.6 mm, for example. Thus, the second storage medium 200 is smaller in size than the first storage medium 100 (see FIG. 2).

The second storage medium 200 has a first principal surface 210a formed with an electrode portion 202 similar to the electrode portion 102 of the first storage medium 100. The electrode portion 202 has a plurality of partition walls 203 arranged at the same pitch as that of the partition walls 103 of the first storage medium 100.

The second storage medium 200 further has portions or members similar to those of the first storage medium 100 in such a manner that terminal electrodes 205 are respectively placed in connection recesses 204, and a housing 202 has a recess 206, a chamfered portion 207, an improper recording preventing tab 208, a fall preventing recess 209, and an engagement recess 210. However, the second storage medium 200 has no engagement groove corresponding to the engagement groove 111 of the first storage medium 100.

The width of the electrode portion 202 in the lateral direction of the second storage medium 200 is the same as the width of the electrode portion 102 in the lateral direction of the first storage medium 100. That is, the distance D21 from the right end of the rightmost terminal electrode 205 in the second storage medium 200 to the right side surface 201b of the housing 201 is slightly smaller than the distance D11 from the right end of the rightmost terminal electrode 105 in the first storage medium 100 to the right side surface 101b of the housing 101. Further, the distance D22 from the left end of the leftmost terminal electrode 205 in the second storage medium 200 to the left side surface 201b of the housing 201 is slightly smaller than the distance D12 from the left end of the leftmost terminal electrode 105 in the first storage medium 100 to the left side surface 101b of the housing 101 (see FIGS. 1 and 2).

Figure 3:
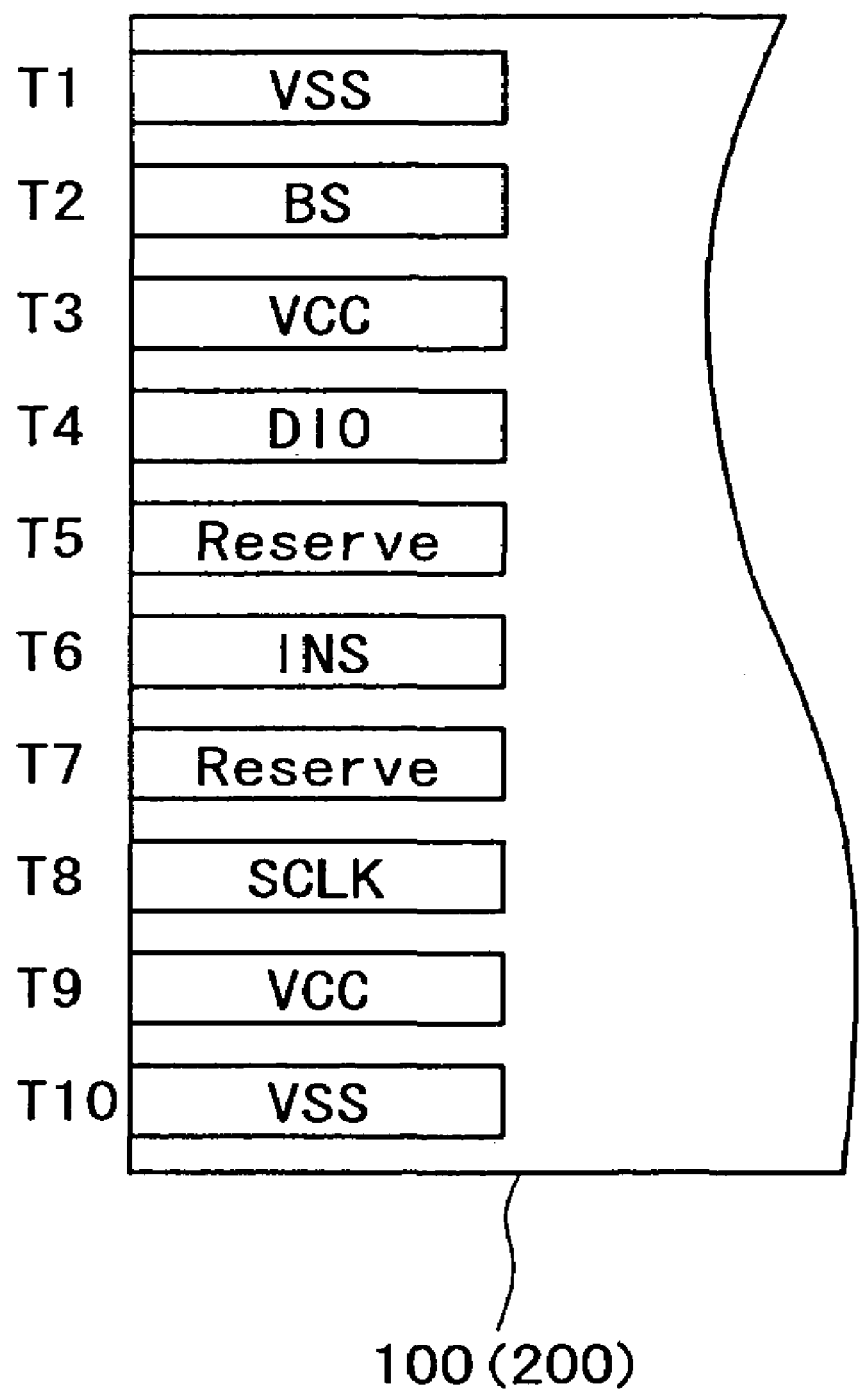
FIG. 3 is a schematic view showing the electrode structure of each storage medium.

The electrode structure of the terminal electrodes 105 in the first storage medium 100 and the electrode structure of the terminal electrodes 205 in the second storage medium 200 will now be described (see FIG. 3). The electrode structure of the terminal electrodes 105 is the same as that of the terminal electrodes 205.

Each electrode structure of the terminal electrodes 105 and the terminal electrodes 205 is configured by arranging ten planar electrodes (terminals T1 to T10) in a row.

The terminals T1 and T10 are terminals for detection voltage VSS. The terminal T2 is an input terminal for serial protocol bus state signal BS. The terminals T3 and T9 are terminals for supply voltage V storage medium. The terminal T4 is an input/output terminal for serial protocol data signal. The terminals T5 and T7 are reserve terminals. The terminal T6 is a detection terminal for detection of the first storage medium 100 and the second storage medium 200. The terminal T8 is an input terminal for serial clock SCLK.

Figure 4:
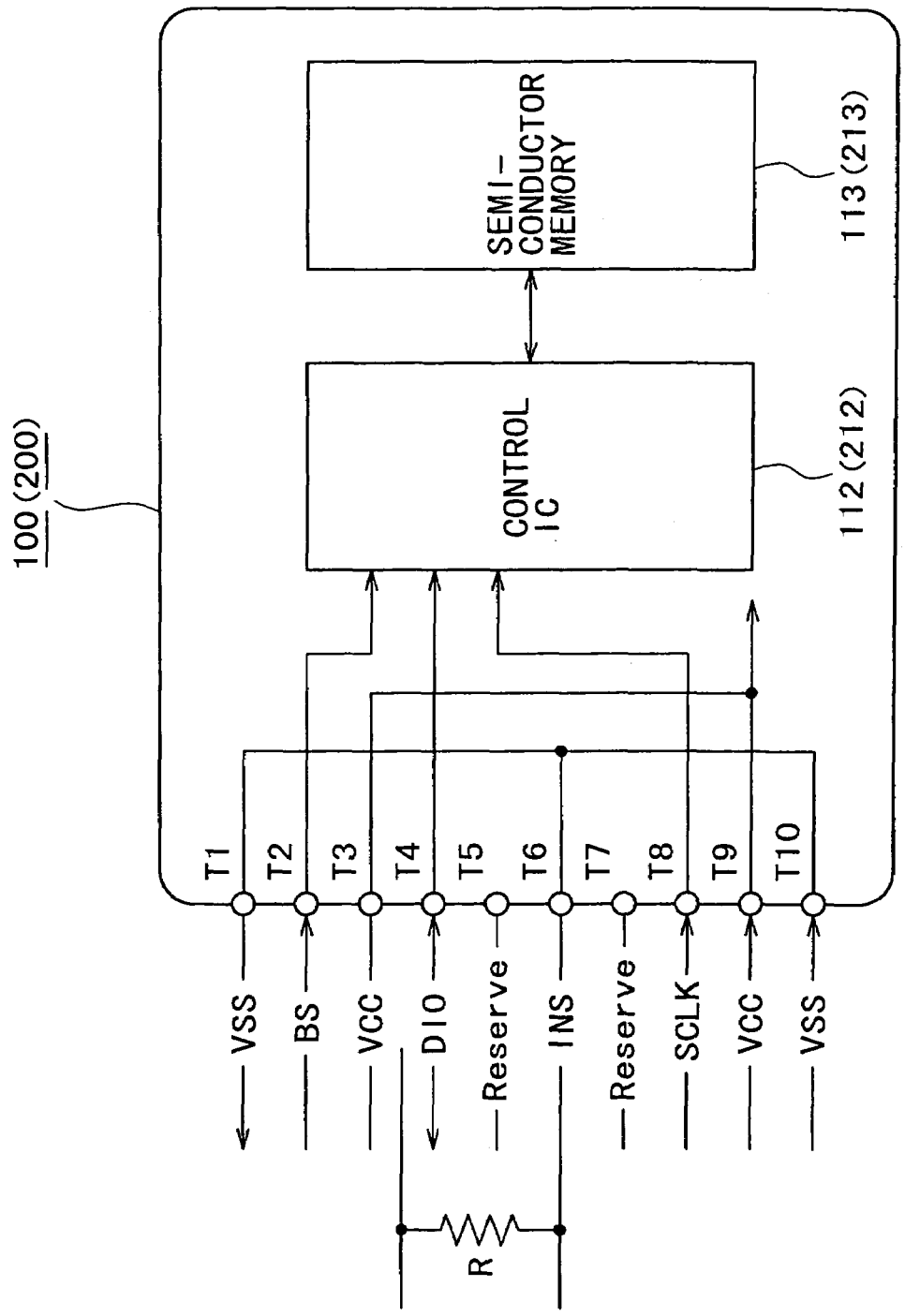
FIG. 4 is a schematic view showing the internal structure and the electrode structure of each storage medium.

The relation between the terminals T1 to T10 and the internal structures of the first storage medium 100 and the second storage medium 200 will now be described (see FIG. 4). The internal structure of the first storage medium 100 is the same as that of the second storage medium 200.

Control ICs 112 and 212 and semiconductor memories 113 and 213 are incorporated in the housings 101 and 201, respectively.

The control ICs 112 and 212 have a function of performing reading/writing of data from/to the semiconductor memories 113 and 213, respectively. Each of the control ICs 112 and 212 is connected to the terminals T2, T4, and T8. The serial protocol bus state signal BS is input from the terminal T2, and the serial clock SCLK is input from the terminal T8.

In writing, data input from the terminal T4 is written to each of the semiconductor memories 113 and 213 according to the serial protocol bus state signal BS input from the terminal T2 and the serial clock SCLK input from the terminal T8.

In reading, data is read from each of the semiconductor memories 113 and 213 according to the serial protocol bus state signal BS and the serial clock SCLK, and the data read through the terminal T4 is output to the storage medium drive unit.

The detection voltage VSS is input to the terminal T6, and a voltage at the terminal T6 is detected by a resistor R in the storage medium drive unit to thereby detect whether the first storage medium 100 or the second storage medium 200 is inserted in the slot of the storage medium drive unit.

Figure 5:
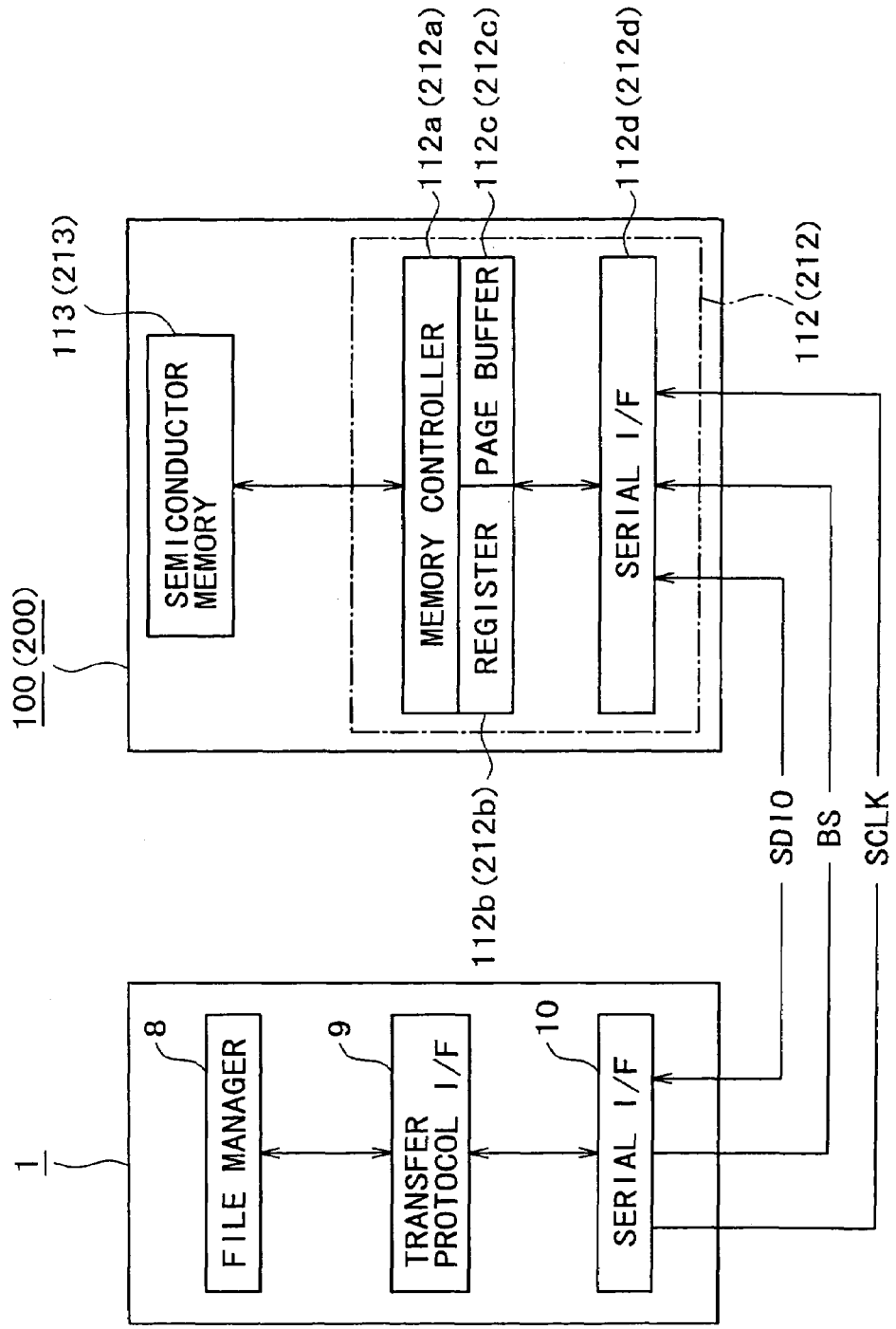
FIG. 5 is a schematic view showing an interface configuration between the storage medium drive unit and each storage medium.

The control ICs 112 and 212 have memory controllers 112a and 212a, registers 112b and 212b, page buffers 112c and 212c, and serial interfaces 112d and 212d, respectively (see FIG. 5).

The memory controllers 112a and 212a perform data transfer between the semiconductor memories 113 and 213 and the page buffers 112c and 212c according to parameters set in the registers 112b and 212b, respectively. Data buffered in the page buffers 112c and 212c are transferred through the serial interfaces 112d and 212d to the storage medium drive unit, respectively. Data transferred from the storage medium drive unit are buffered through the serial interfaces 112d and 212d into the page buffers 112c and 212c, respectively.

A storage medium drive unit for performing reading/writing of data from/to the first storage medium 100 and the second storage medium 200 will now be described (see FIGS. 5 to 7).

The storage medium drive unit 1 is capable of performing reading/writing of various data such as moving image data, still image data, voice data, HiFi data (audio data), computer data, and control data from/to the first storage medium 100 and the second storage medium 200, and required components are incorporated in a housing 2.

Figure 6:
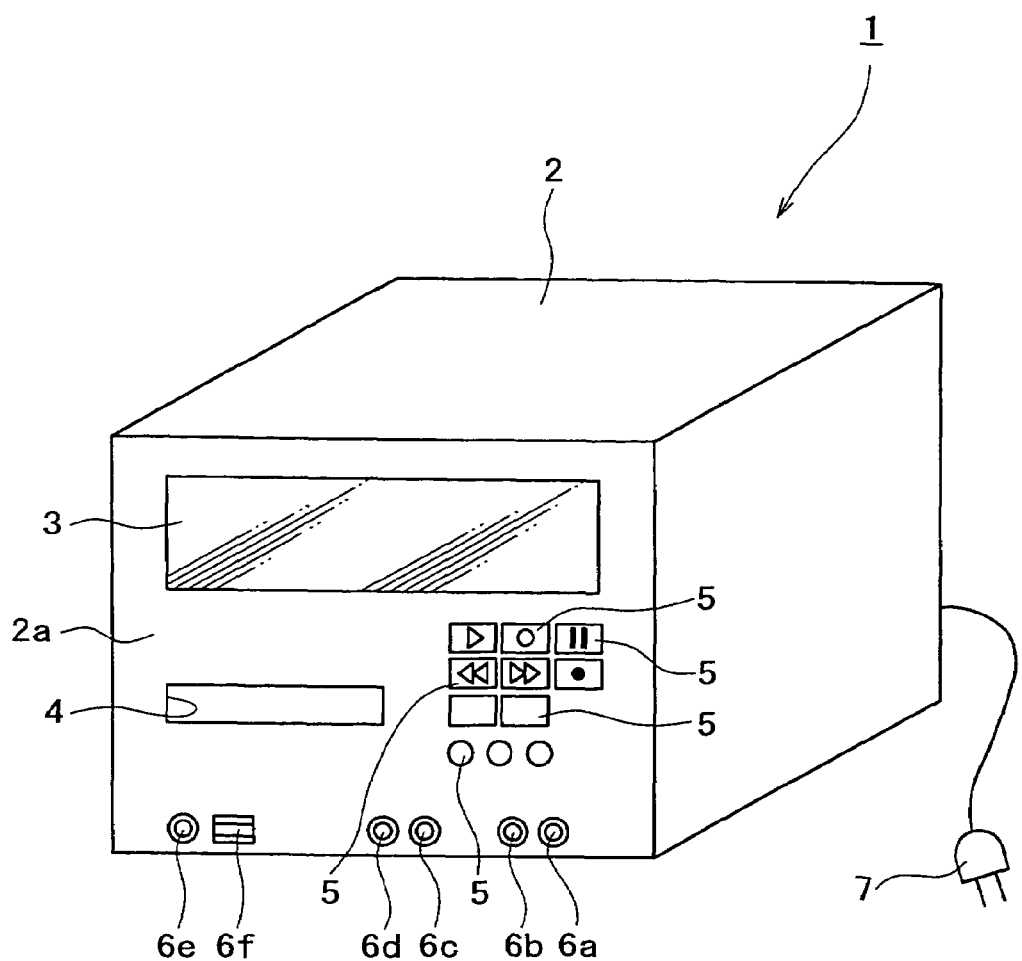
FIG. 6 is a schematic perspective view of the storage medium drive unit.

The housing 2 has a front surface 2a provided with a display section 3 formed by a liquid crystal panel (see FIG. 6). The display section 3 functions to display reproduced images and characters, information on voice and music to be reproduced, operation guide messages, and the like.

The front surface 2a is formed with a slot 4 for insertion of the first storage medium 100 or the second storage medium 200.

The front surface 2a is provided with a plurality of operation keys 5. Operating the operation keys 5 allows various operations such as switching on and off of power, recording and reproduction of data, stopping of recording operation, reproducing operation, and the like, fast forward and fast reverse operations in reproduction, changing of sound volume, data editing, menu selection, and setting of operation mode.

A plurality of connection terminals to be connected to various kinds of equipment are provided at a lower end portion of the front surface 2a. For example, the connection terminals are a headphone terminal 6a, line output terminal 6b, microphone input terminal 6c, line input terminal 6d, digital input terminal 6e, and USB (Universal Serial Bus) terminal 6f.

The storage medium drive unit 1 is supplied with power from a commercial power outlet, for example, through a line cord plug 7.

The storage medium drive unit 1 includes a file manager 8, a transfer protocol interface 9, and a serial interface 10 as an interface structure for the first storage medium 100 and the second storage medium 200 (see FIG. 5).

The file manager 8 functions to manage the first storage medium 100 and the second storage medium 200. That is, access to the first storage medium 100 or the second storage medium 200 is performed according to a command from the file manager 8.

The transfer protocol interface 9 performs access to the register 112b or 212b and the page buffer 112c or 212c of the first storage medium 100 or the second storage medium 200.

The serial interface 10 specifies a protocol for making arbitrary data transfer in respect of the serial clock (SCLK), bus state (BS), and serial data (SDIO) when the first storage medium 100 or the second storage medium 200 is inserted into the slot 4, so that data exchange is carried out between the serial interface 10 and the serial interface 112d or 212d of the first storage medium 100 or the second storage medium 200.

The circuit configuration in the storage medium drive unit 1 will now be described (see FIG. 7).

Reference numeral 11 denotes a CPU (Central Processing Unit) functioning as a central control section in the storage medium drive unit 1 and performing operation control for the following components.

The CPU 11 has a ROM (Read Only Memory) 11a preliminarily storing operation programs and various constants and a RAM (Random Access Memory) 11b as a working region, for example. The CPU 11 performs control operations specified by the stored operation programs according to command signals input by the operation to the operation keys 5.

The CPU 11 makes a flash memory 12 store system setting information on the operation of setting of various modes such as a music recording mode and a display mode. Further, the CPU 11 makes a buffer memory 13 such as a DRAM temporarily store data in reading/writing to the first storage medium 100 or the second storage medium 200.

A real time clock 14 has a function of counting present date and time. The CPU 11 checks the present date and time by inputting the date and time data from the real time clock 14.

A USB interface 15 is an interface for communication between the storage medium drive unit 1 and external equipment such as a personal computer connected to the USB terminal 6f provided on the housing 2. The CPU 11 allows data communication between the storage medium drive unit 1 and the external equipment through the USB interface 15. For example, various data such as control data, computer data, image data, and audio data are transmitted and received between the storage medium drive unit 1 and the external equipment.

A regulator 16 and a DC/DC converter 17 are provided as a power supply section. In switching on the power of the storage medium drive unit 1, the CPU 11 supplies a power-on command signal to the regulator 16. The regulator 16 performs rectifying/smoothening of an AC voltage supplied through the line cord plug 7 according to the command signal from the CPU 11. A supply voltage from the regulator 16 is converted into a required voltage value by the DC/DC converter 17, and this converted voltage is supplied as an operational supply voltage V storage medium to each section.

The CPU 11 is accessible through a memory interface 18 to the first storage medium 100 or the second storage medium 200, thereby allowing execution of recording, reproduction, editing, and the like of various data.

The CPU 11 controls a display driver 19 to thereby make the display section 3 provided on the housing 2 display a required image.

As an audio signal processing system for the plural connection terminals provided on the housing 2, that is, the headphone terminal 6a, the line output terminal 6b, the microphone input terminal 6c, the line input terminal 6d, and the digital input terminal 6e, there are provided a SAM (Security Application Module, or encoding/expansion processing section) 20, DSP (Digital Signal Processor) 21, analog digital converting section 22, power amplifier 23, microphone amplifier 24, optical input module 25, and digital input section 26.

The SAM 20 performs encoding and decoding of data between the CPU 11 and the DSP 21, and an encoding key is exchanged between the SAM 20 and the CPU 11. The encoding key is preliminarily stored in the flash memory 12, for example. The SAM 20 can perform encoding and decoding by using the encoding key. The encoding and decoding by the SAM 20 are performed according to a command from the CPU 11 in transmitting data through the USB interface 15 to the external equipment such as a personal computer or in receiving data from the external equipment, for example.

The DSP 21 performs compression and expansion of audio data according to a command from the CPU 11.

The analog digital converting section 22 performs A/D conversion and D/A conversion on an audio signal.

The digital input section 26 performs input interface processing for digital audio data input through the optical input module 25.

Input and output operations on an audio signal are performed in the storage medium drive unit 1 in the following manner.

An optical signal input as digital audio data from external equipment such as a disc player through an optical cable to the digital input terminal 6e is converted into an electrical signal by the optical input module 25, and this electrical signal is subjected to receiving processing according to a transmission format by the digital input section 26. The digital audio data thus processed by the digital input section 26 is compressed by the DSP 21 and next supplied to the CPU 11 for storage as recording data for the first storage medium 100 or the second storage medium 200.

In the case that a microphone is connected to the microphone input terminal 6c, a voice signal input from the microphone is amplified by the microphone amplifier 24, next converted into a digital signal by the analog digital converting section 22, and next supplied as digital audio data into the DSP 21. The data supplied to the DSP 21 is compressed by the DSP 21 and next supplied to the CPU 11 for storage as recording data for the first storage medium 100 or the second storage medium 200.

A voice signal input from external equipment connected to the line input terminal 6d is converted into a digital signal by the analog digital converting section 22 and next supplied as digital audio data into the DSP 21. The data supplied to the DSP 21 is compressed by the DSP 21 and next supplied to the CPU 11 for storage as recording data for the first storage medium 100 or the second storage medium 200.

On the other hand, in outputting audio data read from the first storage medium 100 or the second storage medium 200, the audio data is expanded by the DSP 21 according to a command from the CPU 11. The digital audio data thus expanded is converted into an analog audio signal by the analog digital converting section 22 and next supplied to the power amplifier 23. The analog audio signal is amplified both for the headphone and for the line output by the power amplifier 23, and the resultant amplified signals are respectively supplied to the headphone terminal 6a and the line output terminal 6b.

The internal structure of the slot 4 formed in the housing 2 will now be described (see FIGS. 8 to 11).

Figure 8:
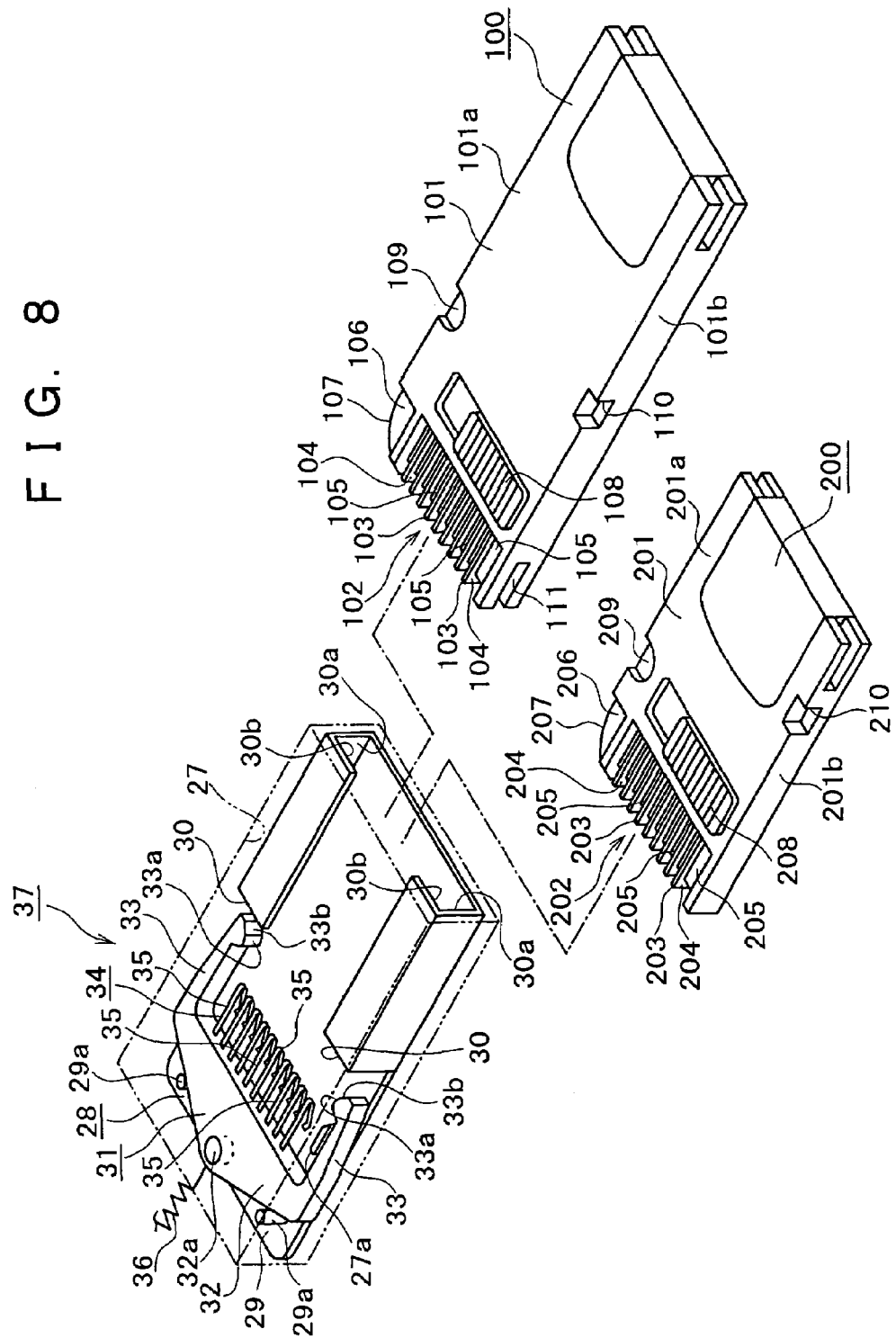
FIG. 8 is an enlarged perspective view showing a loading mechanism in relation to each storage medium.

The internal structure of the slot 4 of the storage medium drive unit 1 is formed as a storage medium mounting portion 27 for mounting the first storage medium 100 or the second storage medium 200 (see FIG. 8). The storage medium mounting portion 27 is provided with an engagement projection 27a adapted to engage with the engagement groove 111 of the first storage medium 100.

A holder 28 is provided in the storage medium mounting portion 27. The holder 28 is integrally formed with a longitudinally extending platelike base portion 29 and a pair of guide portions 30 longitudinally extending from the front end of the base portion 29 along its opposite side edges (see FIGS. 8 and 9). Each guide portion 30 is composed of a vertical wall 30a projecting vertically upward from the base portion 29 and a horizontal wall 30b projecting horizontally inward from the upper end of the vertical wall 30a. That is, the horizontal walls 30b of the right and left guide portions 30 project toward each other from the upper ends of the vertical walls 30a.

A pair of restricting projections 29a are formed on the base portion 29 near its rear end so as to be spaced apart from each other in the lateral direction of the base portion 29.

The space between the vertical walls 30a of the guide portions 30 is substantially the same as or slightly larger than the width W12 of the first storage medium 100 (see FIG. 9), and the space between each horizontal wall 30b and the base portion 29 is slightly larger than the thickness W13 of the first storage medium 100.

Figure 9:
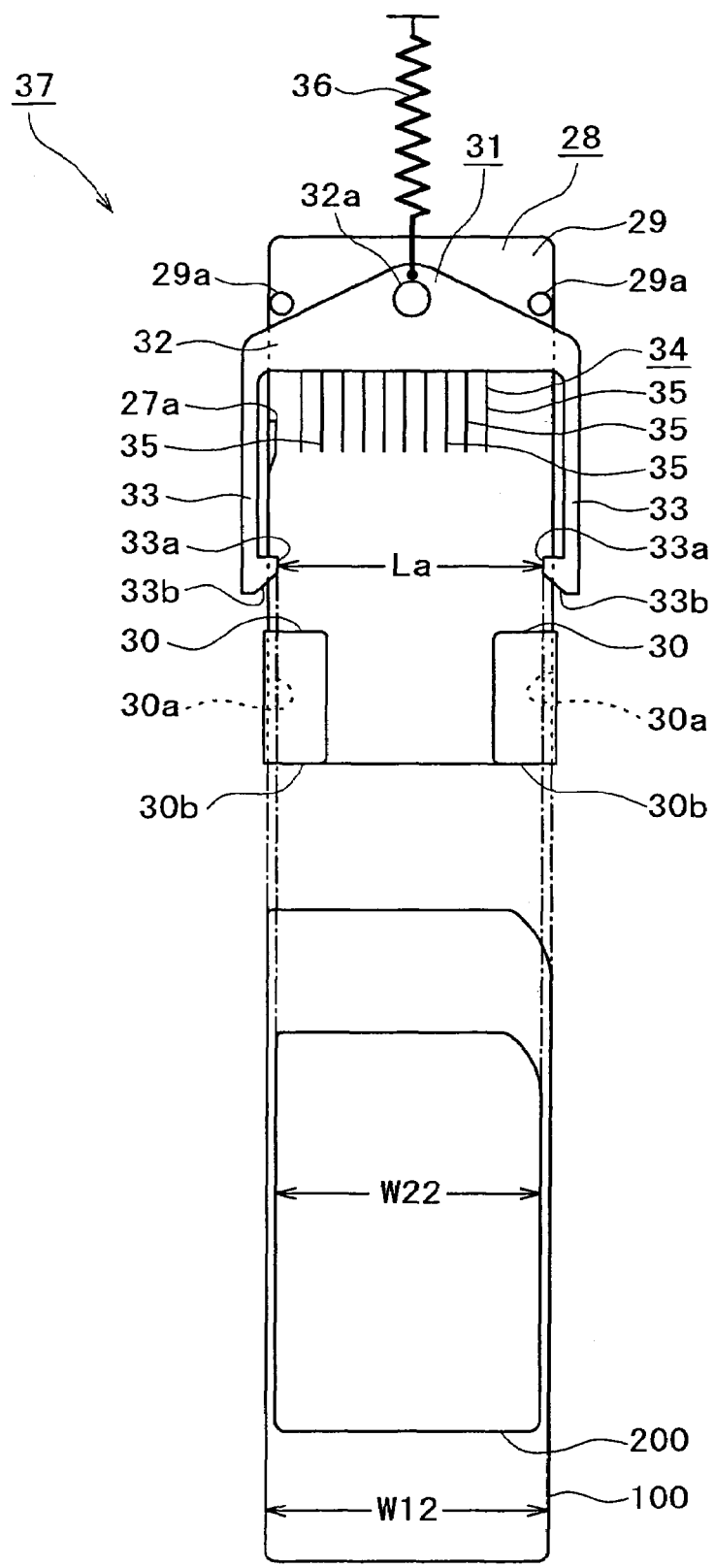
FIG. 9 is an enlarged plan view showing the relation in size between a leading lever and each storage medium.
Figure 10:
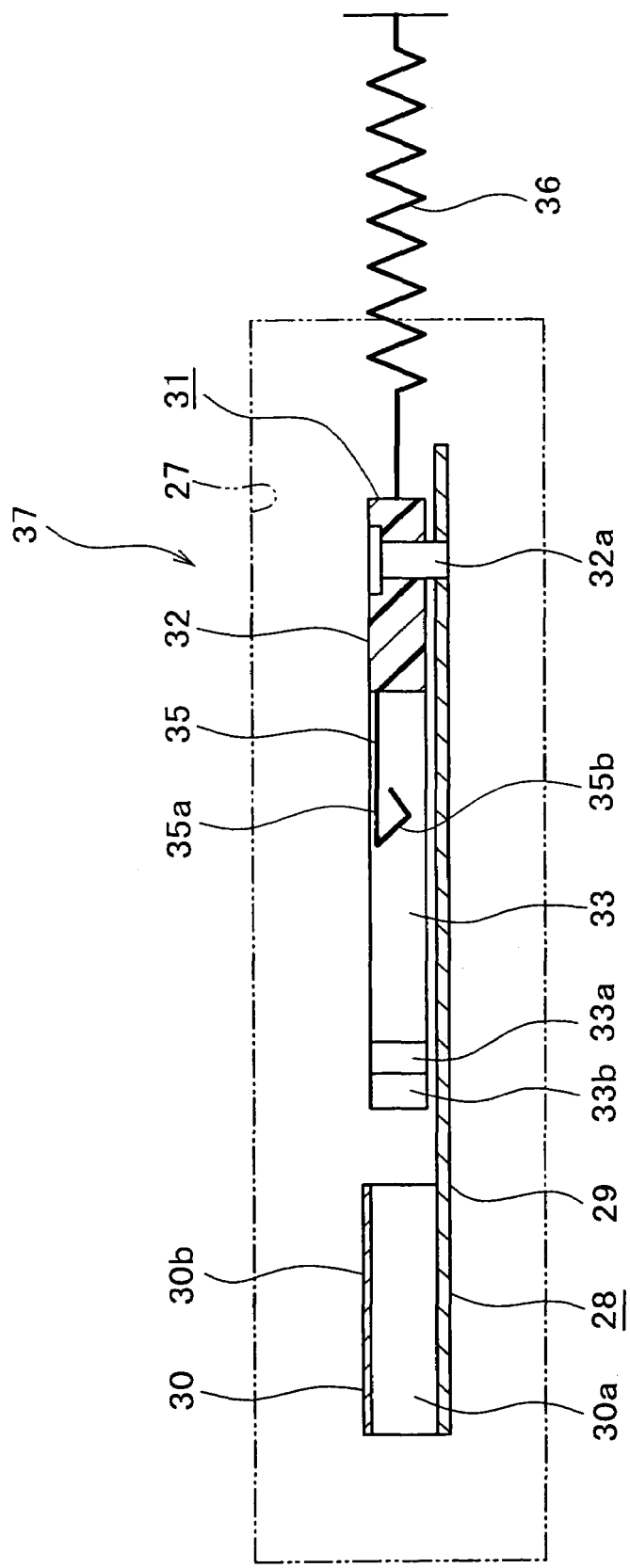
FIG. 10 is an enlarged longitudinal sectional view of the loading mechanism.
Figure 11:
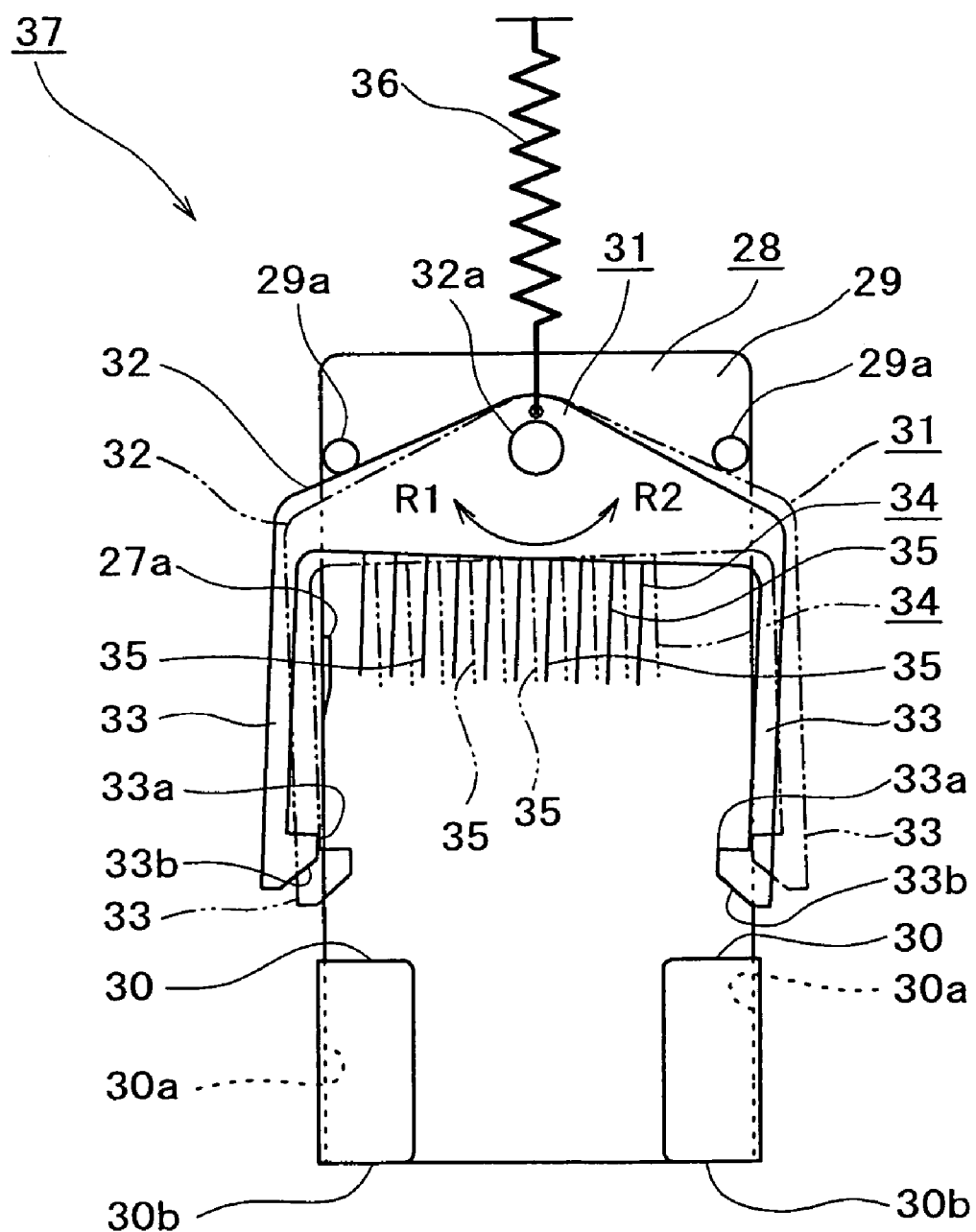
FIG. 11 is an enlarged plan view showing the range of pivotal movement of the leading lever relative to a holder.

A leading lever 31 is pivotably supported at a rear end portion of the base portion 29 of the holder 28 (see FIGS. 8 to 10). The leading lever 31 is integrally formed with a base portion 32 and a pair of elastic portions 33 projecting substantially frontward from the right and left ends of the base portion 32.

A pivot shaft 32a is provided at a laterally central position of the base portion 32, so that the leading lever 31 is pivotably supported through the pivot shaft 32a to the base portion 29 of the holder 28.

Each elastic portion 33 is formed at its front end with a laterally inward projection 33a. The projection 33a is formed with an inclined surface 33b. The projections 33a of the right and left elastic portions 33 project toward each other, and the inclined surfaces 33b of the projections 33a are inclined so that the space therebetween gradually decreases toward the rear end of the holder 28.

The elastic portions 33 are elastically displaceable relative to the base portion 32 in such a direction that the projections 33a are moved in the substantially lateral direction of the holder 28, e.g., in such a direction that the space between the projections 33a is increased.

The minimum distance La between the projections 33a of the leading lever 31 is substantially the same as the width W23 of the second storage medium 200 (see FIG. 9). Accordingly, when the second storage medium 200 is inserted into the holder 28, the opposite side surfaces 201b of the second storage medium 200 come into contact with or proximity to the projections 33a of the right and left elastic portions 33.

A terminal portion 34 is provided on the front side of the base portion 32 of the leading lever 31. The terminal portion 34 is composed of ten connection terminals 35. The connection terminals 35 are arranged at equal intervals in the lateral direction of the base portion 32, and the pitch of the connection terminals 35 is the same as the pitch of the terminal electrodes 105 of the first storage medium 100 and the pitch of the terminal electrodes 205 of the second storage medium 200. The width of each connection terminal 35 in the lateral direction is smaller than the width of each terminal electrode 105 and the width of each terminal electrode 205.

Each connection terminal 35 is formed from a platelike metal member having conductivity, and it is elastically displaceable relative to the base portion 32. Each connection terminal 35 has a leg portion 35a projecting from the base portion 32 and an elastic contact portion 35b bent from the front end of the leg portion 35a so as to have a V-shaped configuration as viewed in side elevation (see FIG. 10). The elastic contact portion 35b is elastically displaceable relative to the leg portion 35a in each connection terminal 35.

Figure 7:
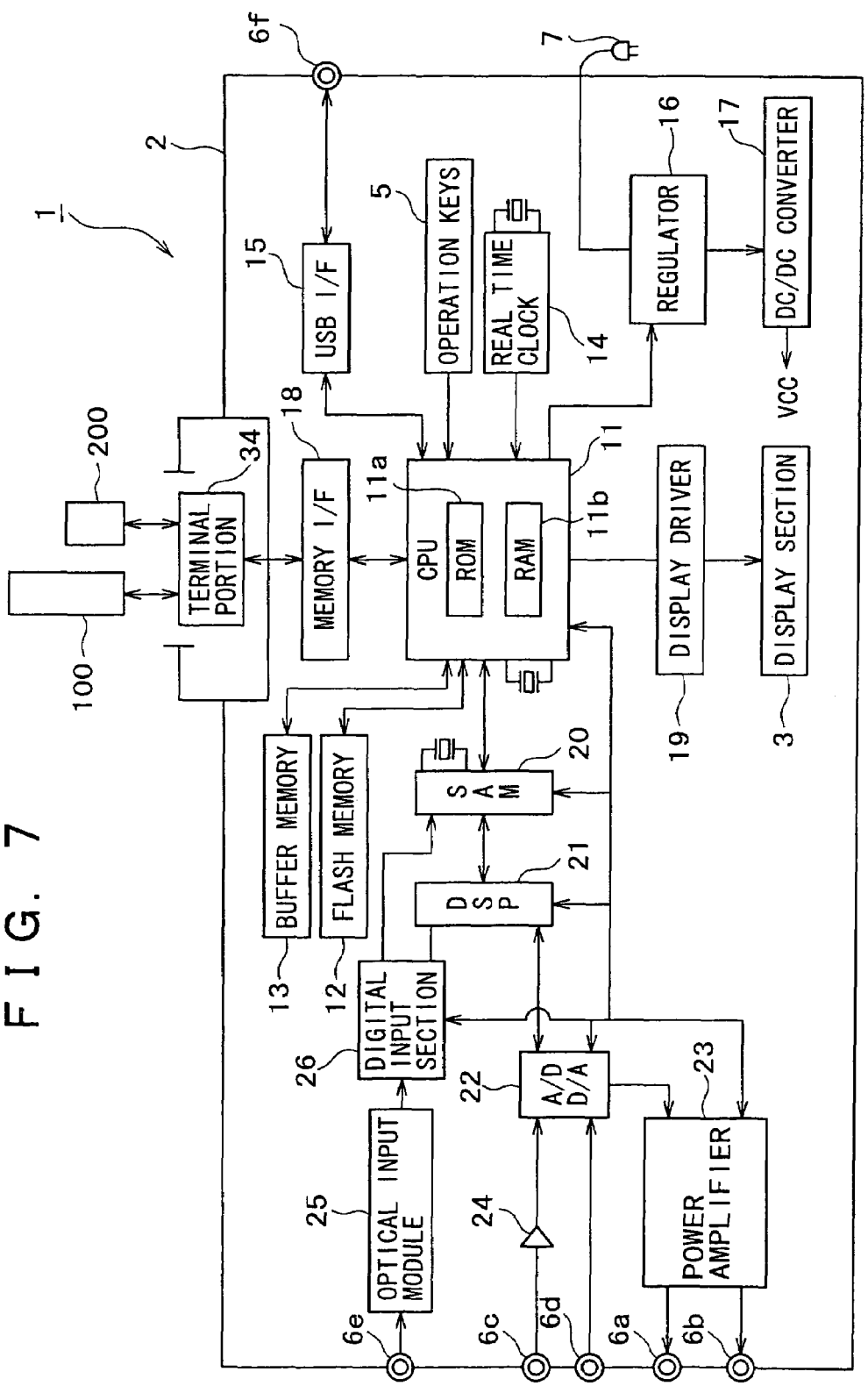
FIG. 7 is a block diagram showing a circuit configuration in the storage medium drive unit.

The terminal portion 34 configured by the ten connection terminals 35 is connected to the memory interface 18 (see FIG. 7).

The leading lever 31 is maintained in its neutral position relative to the holder 28 by a neutralizing spring 36, i.e., at a central position in the range of pivotal movement of the lever 31, in the condition where no external force is applied to the lever 31 (see FIG. 9).

Undue pivotal movement of the leading lever 31 is restricted by the restricting projections 29a formed on the base portion 29 of the holder 28 in such a manner that the base portion 32 of the leading lever 31 comes into abutment against either of the restricting projections 29a. Accordingly, in the range of pivotal movement of the leading lever 31, the front ends P of the inclined surfaces 33b of the right and left projections 33a do not fall laterally inside of the inner surfaces Q of the vertical walls 30a of the right and left guide portions 30 of the holder 28 (see FIG. 11).

The holder 28, the leading lever 31, and the terminal portion 34 as mentioned above constitute a loading mechanism 37 for loading the first storage medium 100 or the second storage medium 200 into the storage medium mounting portion 27.

The operation of the loading mechanism 37 will now be described (see FIGS. 12 to 21). The first storage medium 100 or the second storage medium 200 is inserted from its electrode portion 102 or 202 into the slot 4 of the housing 2.

The operation in the case of inserting the first storage medium 100 into the slot 4 will first be described (see FIGS. 12 to 14).

Figure 12:
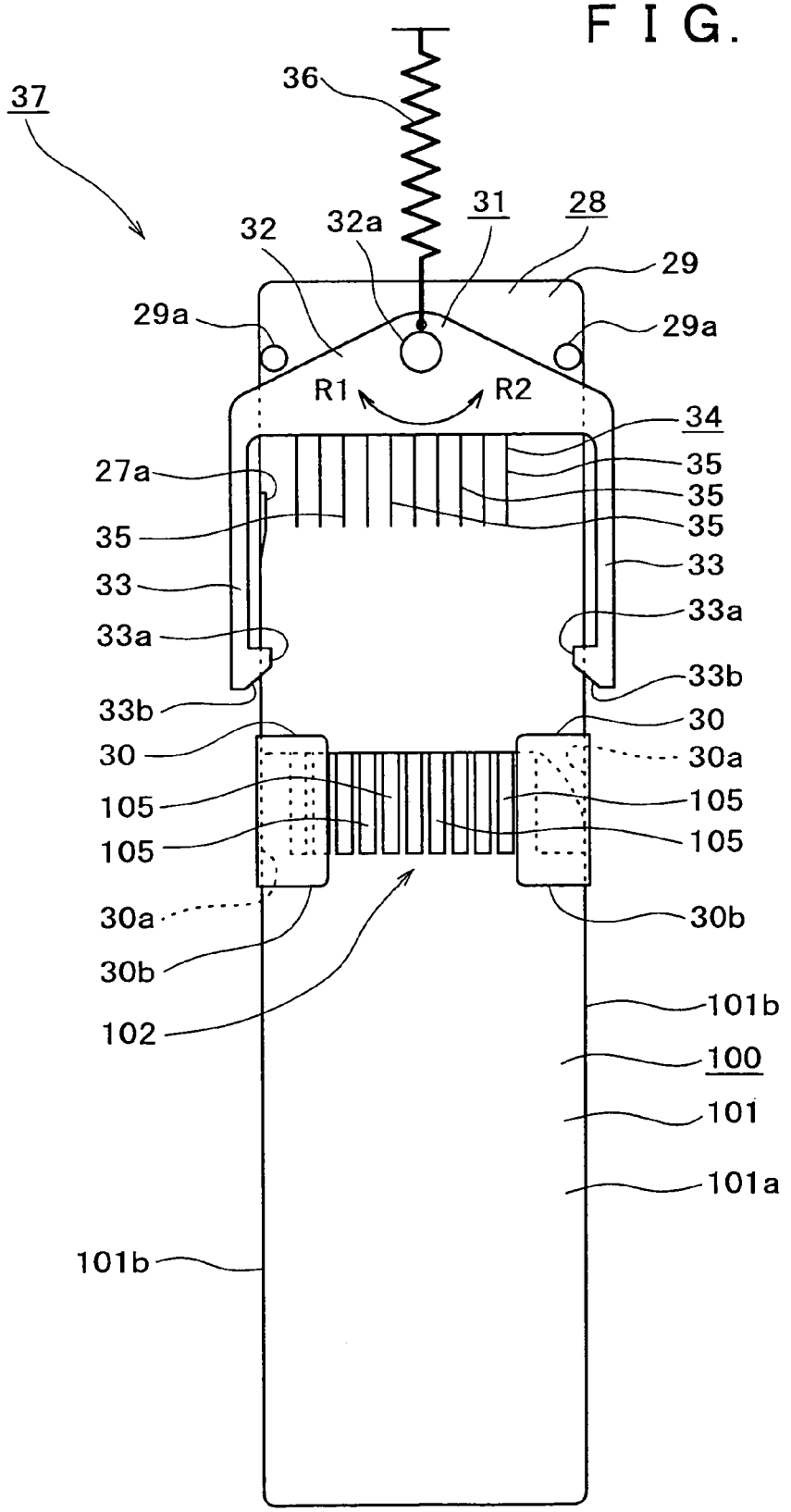
FIG. 12 is an enlarged plan view showing a condition just after the first storage medium is inserted into the holder in the operation of the loading mechanism together with FIG. 13 to FIG. 21.

When the first storage medium 100 is inserted into the slot 4, the opposite side surfaces 101b of the first storage medium 100 are guided by the vertical walls 30a of the guide portions 30 of the holder 28 during rearward movement into the storage medium drive unit 1 (see FIG. 12).

Figure 13:
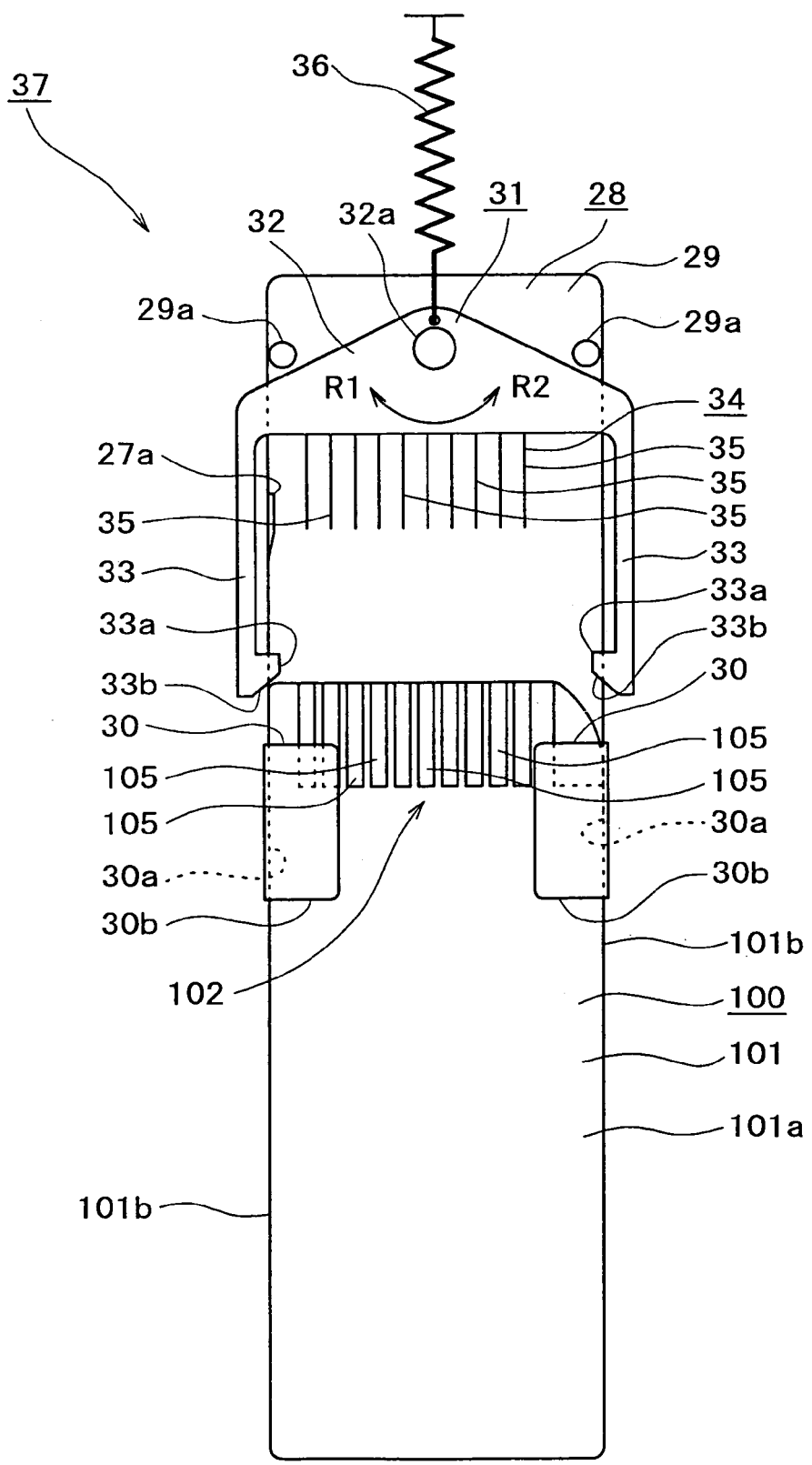
FIG. 13 is an enlarged plan view showing a condition where the first storage medium comes into sliding contact with an inclined surface of the leading lever.

During the rearward movement, the first storage medium 100 comes into sliding contact with the inclined surfaces 33b of the elastic portions 33 of the leading lever 31 (see FIG. 13). Since the width W12 of the first storage medium 100 is larger than the minimum distance La between the projections 33a, the elastic portions 33 are elastically displaced in opposite directions so as to be moved apart from each other during the rearward movement of the first storage medium 100 (see FIG. 14).

Figure 14:
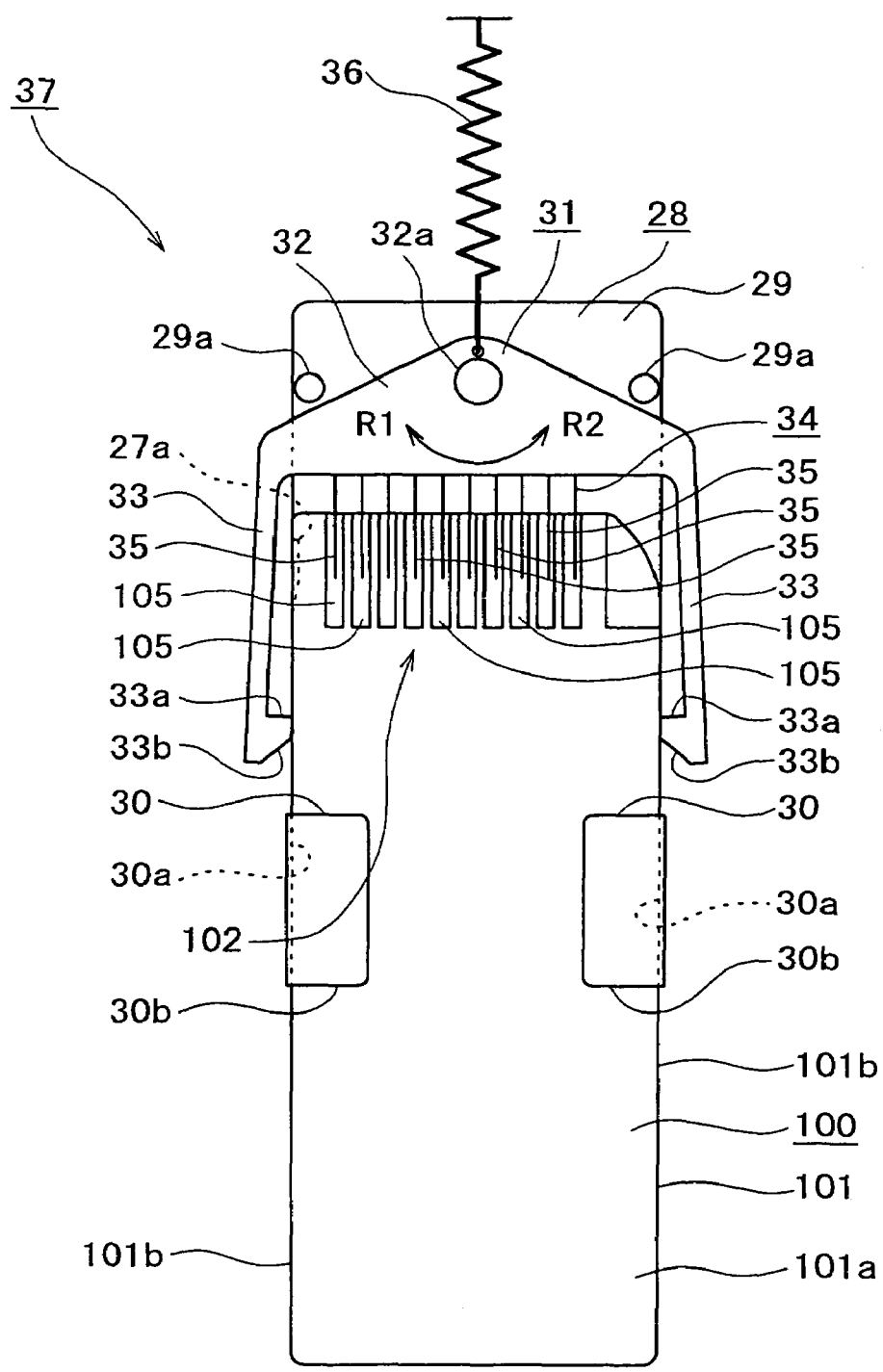
FIG. 14 is an enlarged plan view showing a condition where the first storage medium is mounted in a storage medium mounting portion.

At this time, the first storage medium 100 is inserted between the elastic portions 33 and the terminal electrodes 105 of the first storage medium 100 are brought into connection with the respective connection terminals 35 (see FIG. 14). Since the connection terminals 35 are elastically displaceable, the elastic contact portions 35b of the connection terminals 35 come into elastic contact with the respective terminal electrodes 105, thereby ensuring reliable connection between the connection terminals 35 and the terminal electrodes 105. In the condition where the terminal electrodes 105 are connected with the respective connection terminals 35, the engagement projection 27a is engaged with the engagement groove 111 of the first storage medium 100 (see FIG. 14).

The first storage medium 100 can be removed from the slot 4 by operating an eject button (not shown) provided on the housing 2 to operate an eject mechanism (not shown) provided in the slot 4, thereby ejecting the first storage medium 100 from the slot 4. When the first storage medium 100 is removed from the slot 4, the elastic portions 33 displaced are elastically returned to their original positions where the first storage medium 100 is not inserted in the slot 4.

The operation in the case of inserting the second storage medium 200 into the slot 4 will now be described (see FIGS. 15 to 21).

Figure 15:
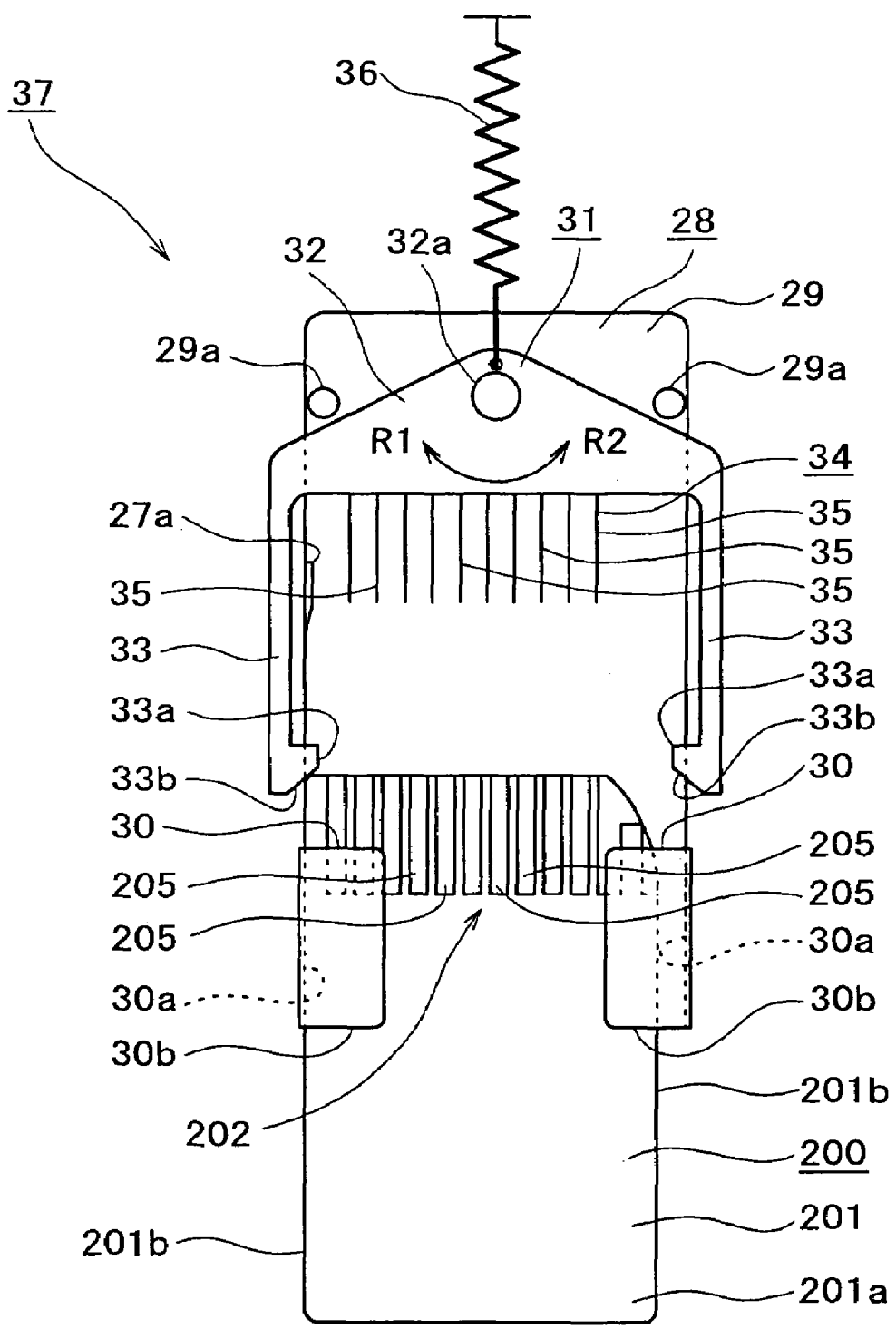
FIG. 15 is an enlarged plan view showing a condition where the second storage medium is inserted into the holder in a leftward deviated condition and next comes into sliding contact with the inclined surface of the leading lever.

When the second storage medium 200 is inserted into the slot 4 in the leftward deviated condition with respect to the slot 4, the second storage medium 200 comes into sliding contact with the inclined surface 33b of the left elastic portion 33 of the leading lever 31 (see FIG. 15).

Figure 16:
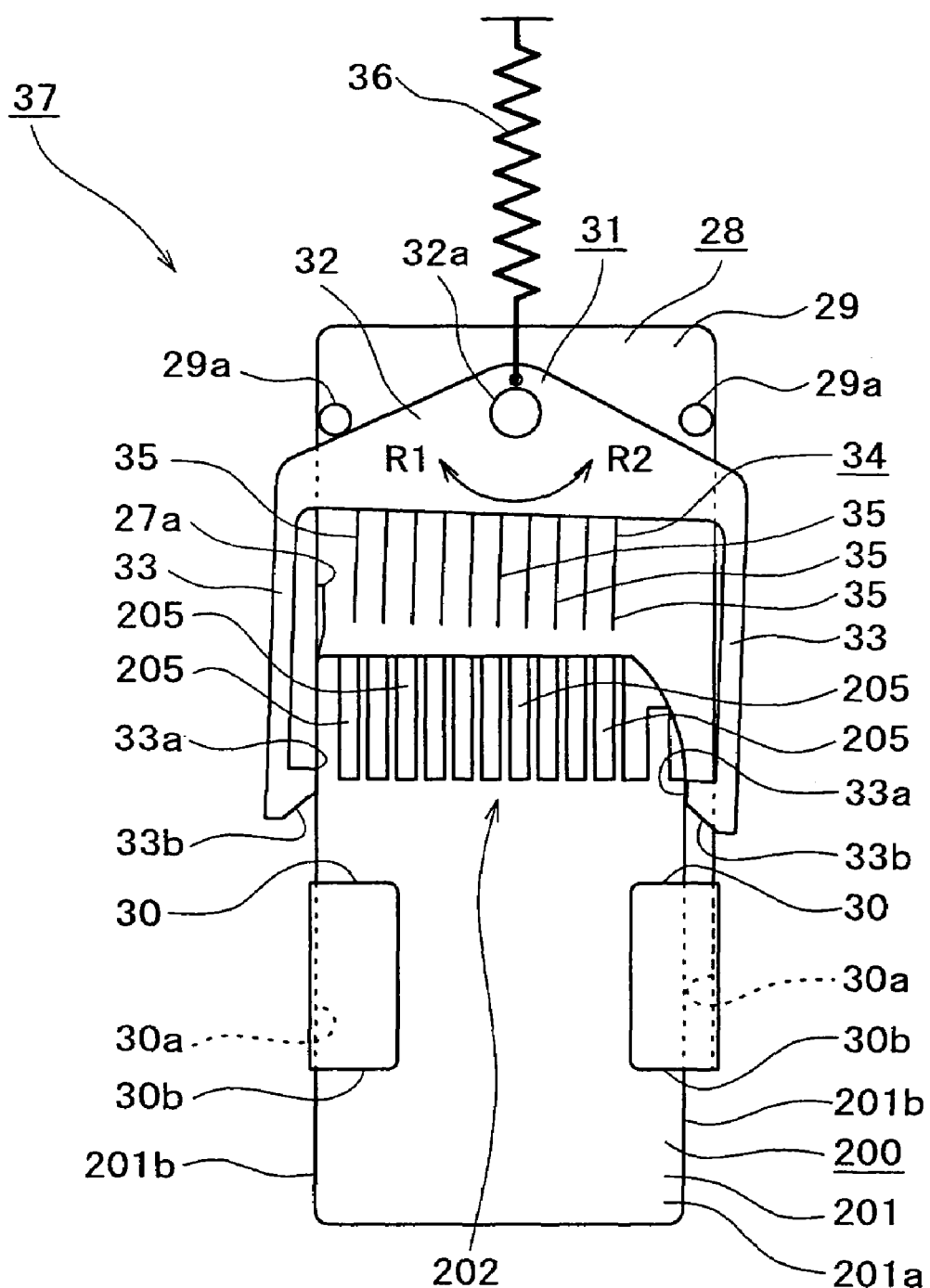
FIG. 16 is an enlarged plan view showing a condition where the leading lever is pivotally moved in a direction R1, subsequent to the condition shown in FIG. 15.

During the rearward movement of the second storage medium 200 with the sliding contact with the inclined surface 33b of the left elastic portion 33, that is, during the insertion of the second storage medium 200 into the storage medium drive unit 1, the leading lever 31 is pivotally moved in a direction R1 by a depression force of the second storage medium 200 to the inclined surface 33b of the left elastic portion 33 (see FIG. 16). Accordingly, the connection terminals 35 are displaced leftward.

Figure 17:
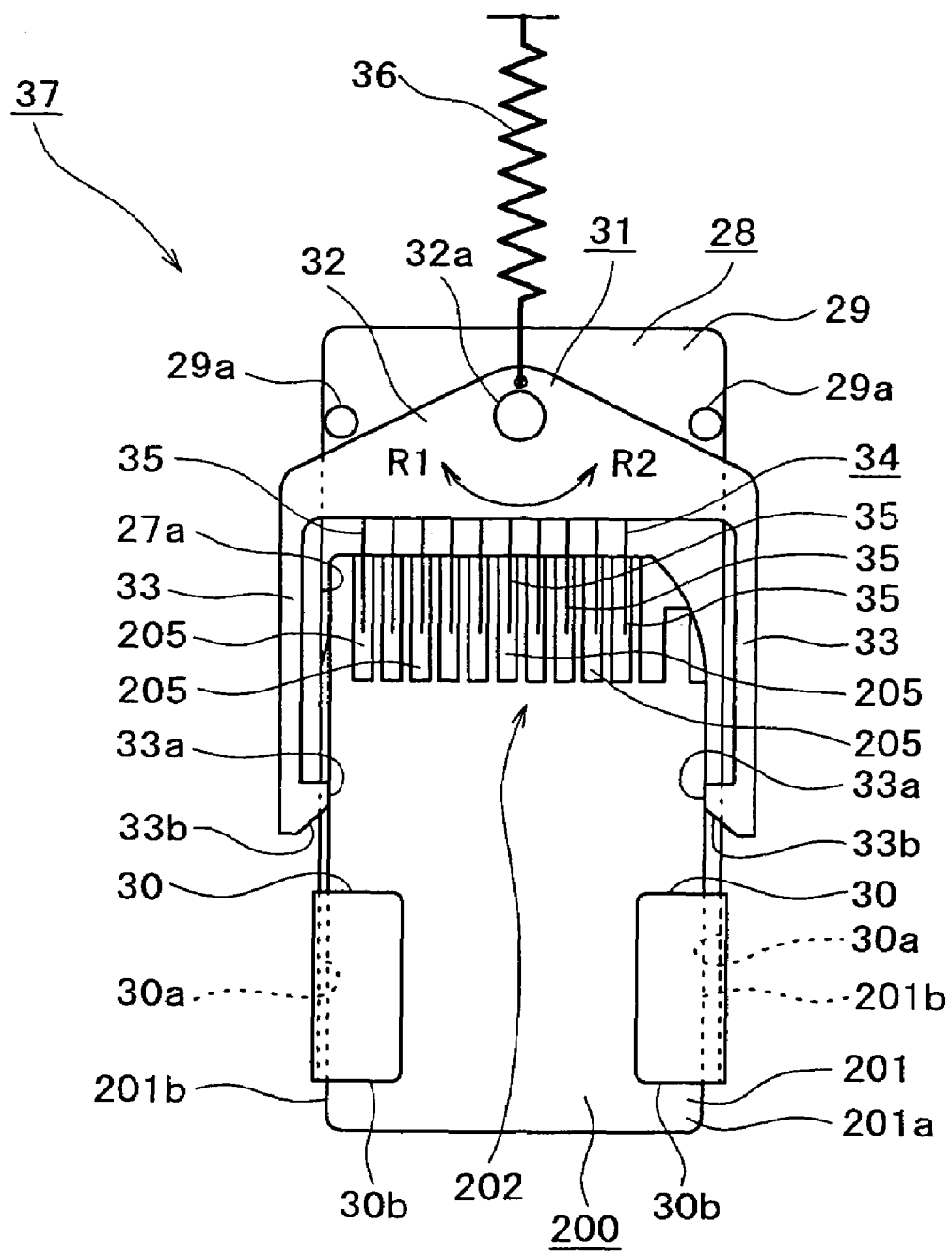
FIG. 17 is an enlarged plan view showing a condition where terminal electrodes of the second storage medium are connected to the connection terminals, subsequent to the condition shown in FIG. 16.

The second storage medium 200 is further inserted between the elastic portions 33, and the terminal electrodes 205 of the second storage medium 200 come into connection with the respective connection terminals 35 displaced leftward by the pivotal movement of the leading lever 31 in the direction R1 (see FIG. 17). Since the connection terminals 35 are elastically displaceable, the elastic contact portions 35b of the connection terminals 35 come into elastic contact with the terminal electrodes 205, thereby ensuring reliable connection between the connection terminals 35 and the terminal electrodes 205.

In comparing the condition where the first storage medium 100 is inserted in the holder 28 and the condition where the second storage medium 200 is inserted in the holder 28, the vertical position of the terminal electrodes 105 and the vertical position of the terminal electrodes 205 in the holder 28 are different from each other because of the difference between the thicknesses W13 and W23. Accordingly, the terminal electrodes 205 are lower in level than the terminal electrodes 105 with respect to the connection terminals 35. However, this difference can be absorbed by the elastic displacement of the connection terminals 35, thereby ensuring reliable connection of the connection terminals 35 with both the terminal electrodes 105 and 205.

Figure 18:
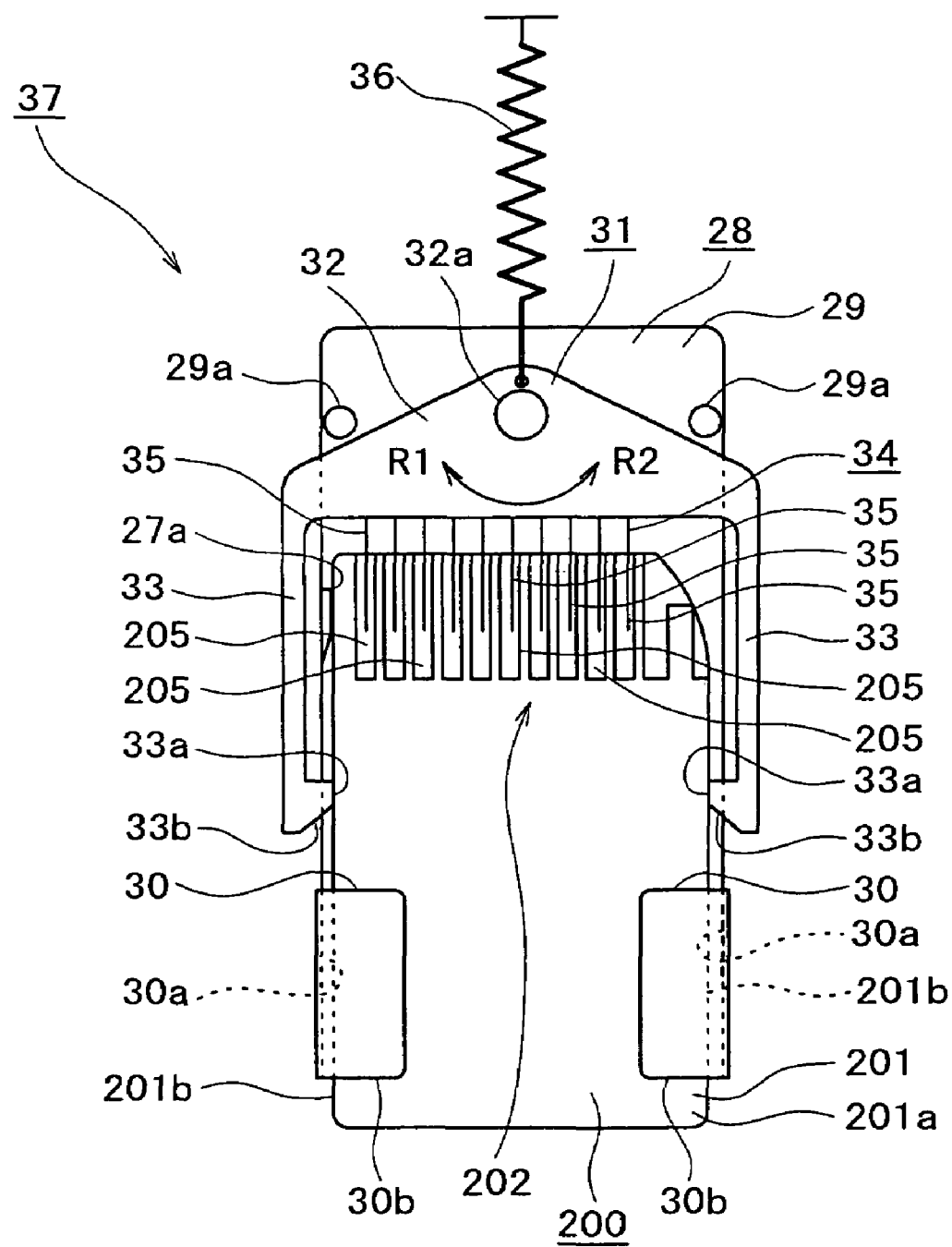
FIG. 18 is an enlarged plan view showing a condition where the leading lever is returned to its neutral position, subsequent to the condition shown in FIG. 17.

In the condition where the second storage medium 200 is mounted in the storage medium mounting portion 27 and the terminal electrodes 205 of the second storage medium 200 are connected to the respective connection terminals 35, the leading lever 31 is maintained in its neutral position by the neutralizing spring 36 (see FIG. 18). In the condition where the terminal electrodes 205 are connected to the respective connection terminals 35, the left side surface 201b of the second storage medium 200 is in contact with the engagement projection 27a.

The second storage medium 200 can be removed from the slot 4 by operating the eject mechanism to eject the second storage medium 200 from the slot 4 as in the case of the first storage medium 100.

Figure 19:
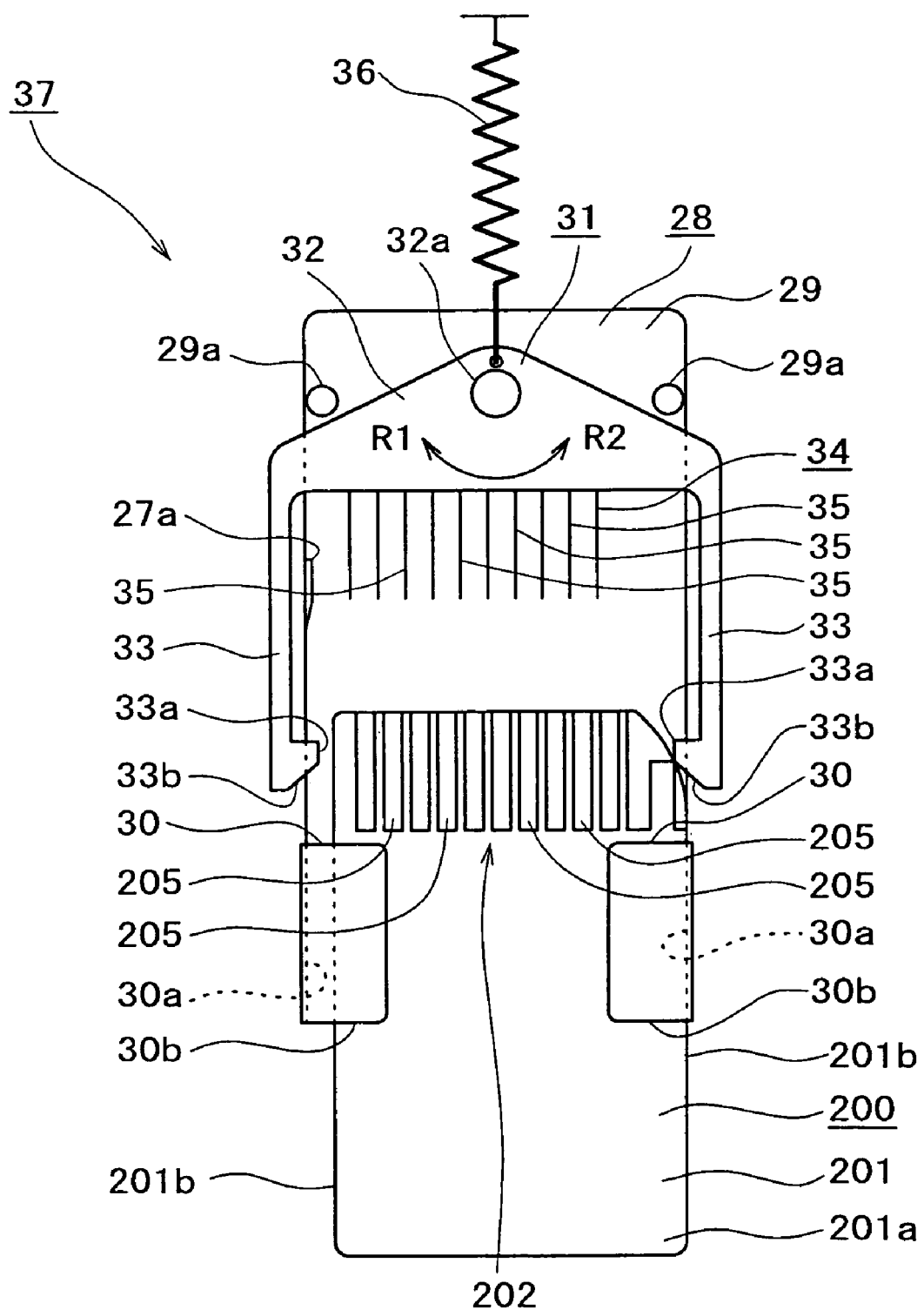
FIG. 19 is an enlarged plan view showing a condition where the second storage medium is inserted into the holder in a rightward deviated condition and next comes into sliding contact with the inclined surface of the leading lever.

Conversely, when the second storage medium 200 is inserted into the slot 4 in the rightward deviated condition with respect to the slot 4, the second storage medium 200 comes into sliding contact with the inclined surface 33b of the right elastic portion 33 of the leading lever 31 (see FIG. 19).

Figure 20:
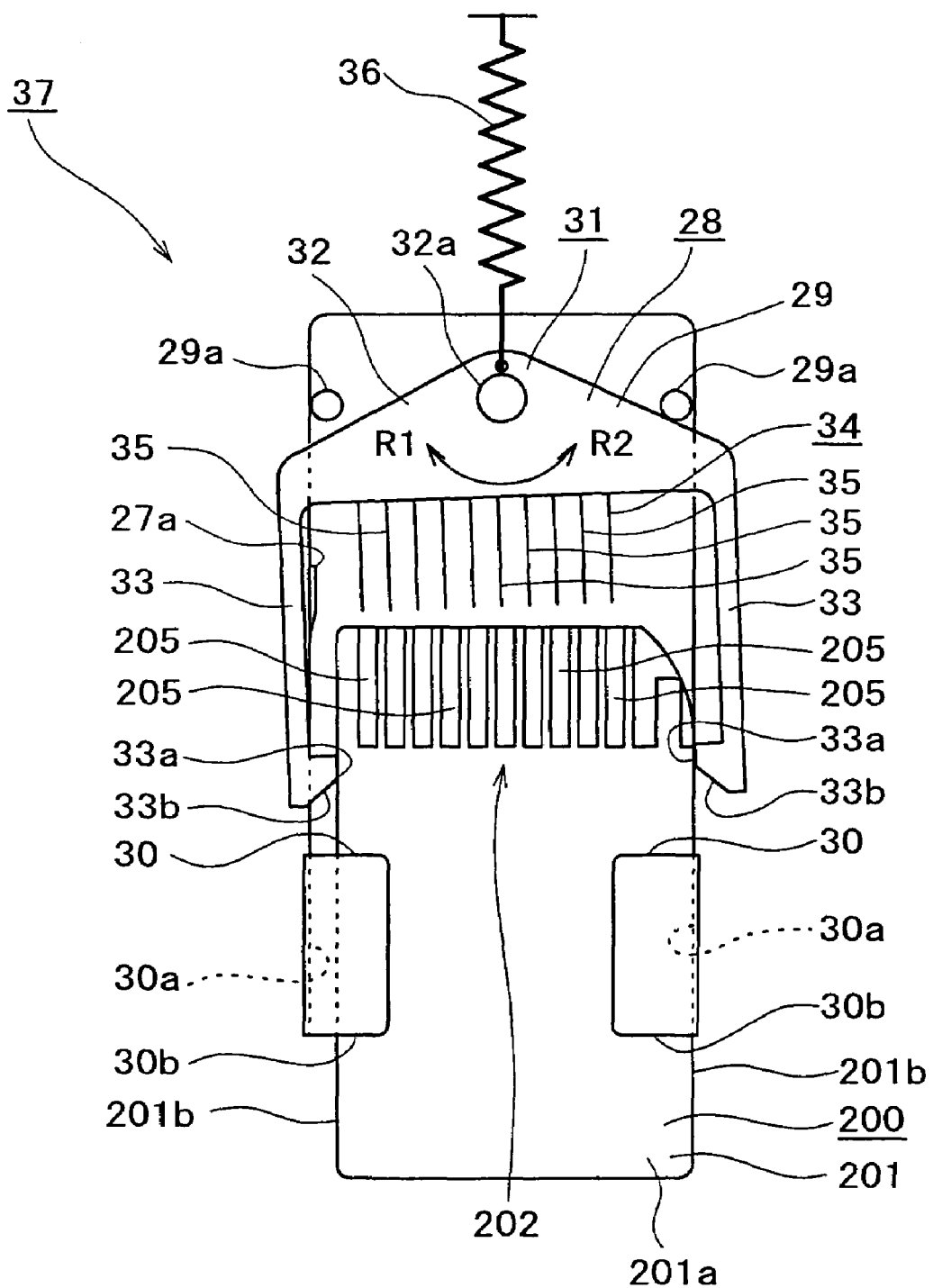
FIG. 20 is an enlarged plan view showing a condition where the leading lever is pivotally moved in a direction R2, subsequent to the condition shown in FIG. 19.

During the rearward movement of the second storage medium 200 with the sliding contact with the inclined surface 33b of the right elastic portion 33, the holder 28 is pivotally moved in a direction R2 by a depression force of the second storage medium 200 to the inclined surface 33b of the right elastic portion 33 (see FIG. 20). Accordingly, the connection terminals 35 are displaced rightward.

Figure 21:
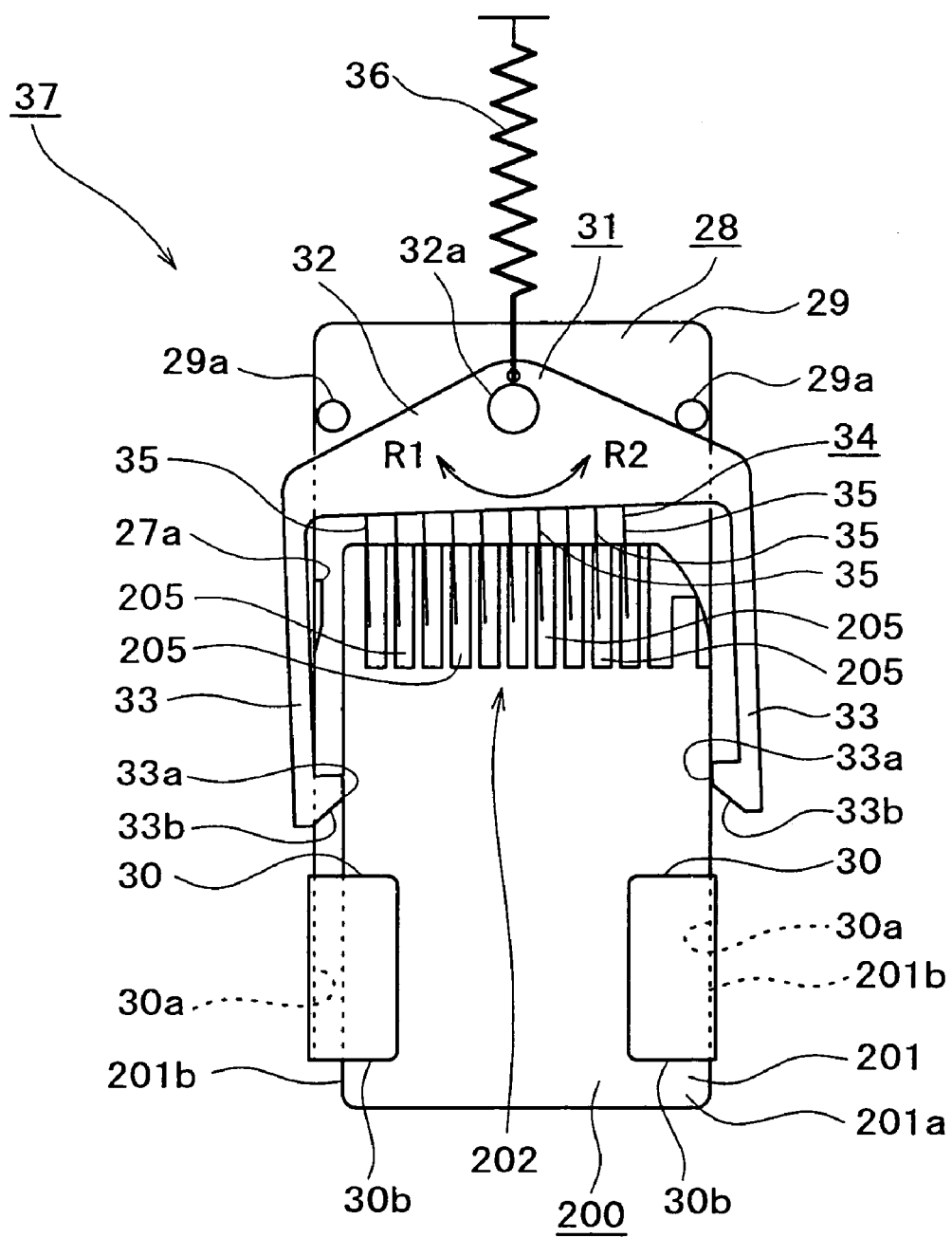
FIG. 21 is an enlarged plan view showing a condition where the terminal electrodes of the second storage medium are connected to the connection terminals, subsequent to the condition shown in FIG. 20.

The second storage medium 200 is further inserted between the elastic portions 33, and the terminal electrodes 105 come into connection with the respective connection terminals 35 displaced rightward by the pivotal movement of the leading lever 31 in the direction R2 (see FIG. 21). Since the connection terminals 35 are elastically displaceable, the elastic contact portions 35b of the connection terminals 35 come into elastic contact with the terminal electrodes 205, thereby ensuring reliable connection between the connection terminals 35 and the terminal electrodes 205.

In the condition where the second storage medium 200 is mounted in the storage medium mounting portion 27 and the terminal electrodes 205 of the second storage medium 200 are connected to the respective connection terminals 35, the leading lever 31 is maintained in its neutral position by the neutralizing spring 36. In the condition where the terminal electrodes 205 are connected to the respective connection terminals 35, the left side surface 201b of the second storage medium 200 is in contact with the engagement projection 27a.

The second storage medium 200 can be removed from the slot 4 by operating the eject mechanism to eject the second storage medium 200 from the slot 4 as in the case of the first storage medium 100.

As described above, when the second storage medium 200 is inserted into the holder 28 of the storage medium drive unit 1, the terminal portion 34 and the second storage medium 200 are led by the leading lever 31 in such a direction that the connection terminals 35 and the terminal electrodes 205 come into connection with each other, respectively. Accordingly, both the first storage medium 100 and the second storage medium 200 can be selectively mounted into the storage medium mounting portion 27 without using any adapter. That is, the slot 4 can be used commonly for the first storage medium 100 and the second storage medium 200, thereby improving the usability.

It is unnecessary to provide any detecting means for detecting the difference in size between the first storage medium 100 and the second storage medium 200 inserted into the slot 4, and it is also unnecessary to provide any respective guides for the first storage medium 100 and the second storage medium 200. Accordingly, the mechanism in the storage medium drive unit 1 can be simplified to thereby reduce a manufacturing cost of the storage medium drive unit 1.

In the storage medium drive unit 1, the terminal portion 34 is fixed to the leading lever 31 so that the terminal portion 34 is movable together with the leading lever 31. Accordingly, it is unnecessary to provide any link mechanism for operating the terminal portion 34 in association with the operation of the leading lever 31. As a result, the number of parts can be reduced and the reliability of the operation can be improved.

Since the leading lever 31 has the elastic portions 33 elastically displaceable by the insertion of the first storage medium 100 into the slot 4, the first storage medium 100 can be reliably led in such a direction that the terminal electrodes 105 come into connection with the connection terminals 35.

Further, since the slot 4 can be used commonly for the first storage medium 100 and the second storage medium 200 only by pivotably mounting the leading lever 31 on the holder 28, the mechanism can be simplified.

The first storage medium 100 is mounted into the storage medium mounting portion 27 as being guided by the holder 28, and the second storage medium 200 is mounted into the storage medium mounting portion 27 as being led by the leading lever 31. Accordingly, the first storage medium 100 and the second storage medium 200 can be selectively mounted into the storage medium mounting portion 27 properly and reliably.

In addition, even when the second storage medium 200 is inserted into the slot 4 in the rightward or leftward deviated condition, the second storage medium 200 is always led by any one of the right and left elastic portions 33. Accordingly, the terminal electrodes 205 can be reliably connected to the connection terminals 35.

While the neutralizing spring 36 is provided to maintain the leading lever 31 in its neutral position, the neutralizing spring 36 is not essential in the present invention, because the front ends P of the right and left inclined surfaces 33b do not fall laterally inside of the inner surfaces Q of the right and left vertical walls 30a of the holder 28, respectively, in the range of pivotal movement of the leading lever 31 (see FIG. 11), and the first storage medium 100 and the second storage medium 200 can always be inserted between the elastic portions 33 of the leading lever 31.

There will now be described a holder 28A and a leading lever 31A as a first modification of the holder 28 and the leading lever 31 (see FIGS. 22 to 27). In comparison with the holder 28 and the leading lever 31, the first modification is different only in the point that the leading lever 31A is laterally movably supported to the holder 28A. Accordingly, this different configuration only will be described in detail and the description of the other configuration will be omitted herein with the same or like parts being denoted by the same reference numerals as those in the loading mechanism 37 mentioned above.

Figure 22:
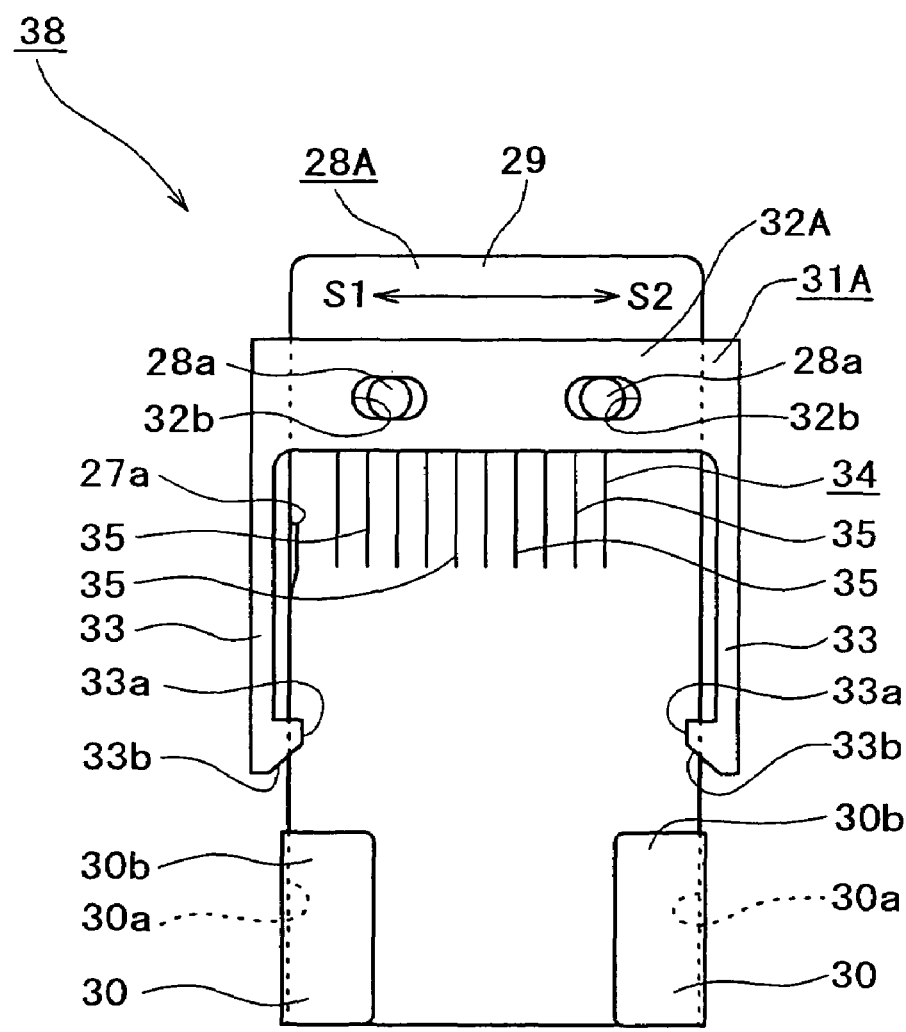
FIG. 22 is an enlarged plan view of a loading mechanism according to a first modification of the preferred embodiment together with FIG. 23 to FIG. 27.

A pair of support pins 28a laterally spaced apart from each other are provided on the holder 28A near the rear end thereof (see FIG. 22). The holder 28A is not provided with restricting projections corresponding to the restricting projections 29a formed on the holder 28 mentioned above.

The leading lever 31A is integrally formed with a base portion 32A and a pair of elastic portions 33 projecting substantially frontward from the right and left ends of the base portion 32A. The base portion 32A is formed with a pair of laterally elongated holes 32b laterally spaced apart from each other. The support pins 28a of the holder 28A are inserted in the elongated holes 32b of the leading lever 31A so that the leading lever 31A is laterally movably supported to the holder 28A, that is, supported to the holder 28A movably in the lateral direction shown by a double headed arrow S1-S2 (see FIG. 22). A terminal portion 34 composed of ten connection terminals 35 is provided on the front surface of the base portion 32A.

The holder 28A, the leading lever 31A, and the terminal portion 34 constitute a loading mechanism 38 for loading the first storage medium 100 or the second storage medium 200 into the slot 4.

The operation of the loading mechanism 38 will now be described (see FIGS. 23 to 27).

Figure 23:
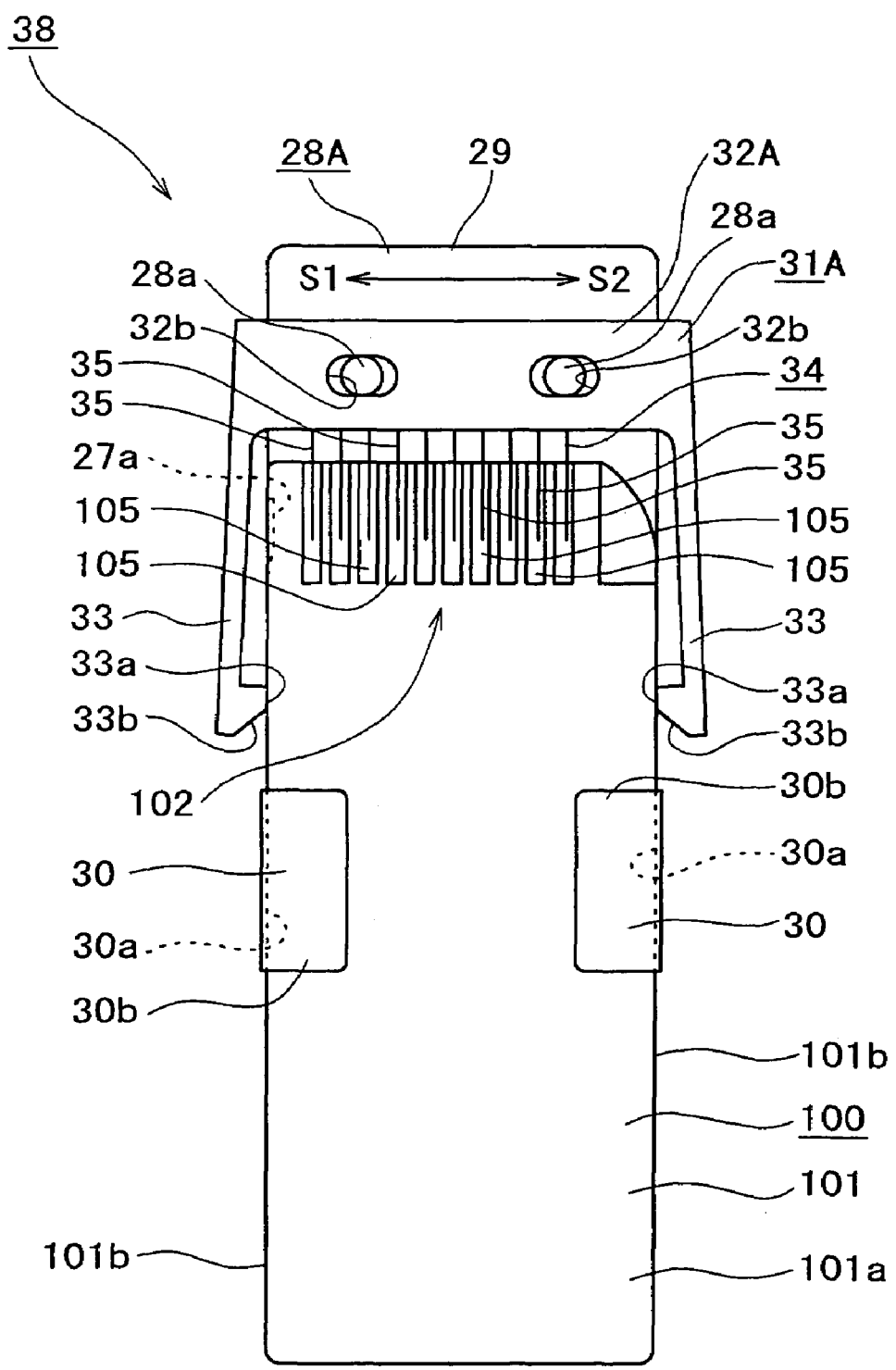
FIG. 23 is an enlarged plan view showing a condition where the first storage medium is mounted in the storage medium mounting portion according to the first modification.
Figure 24:
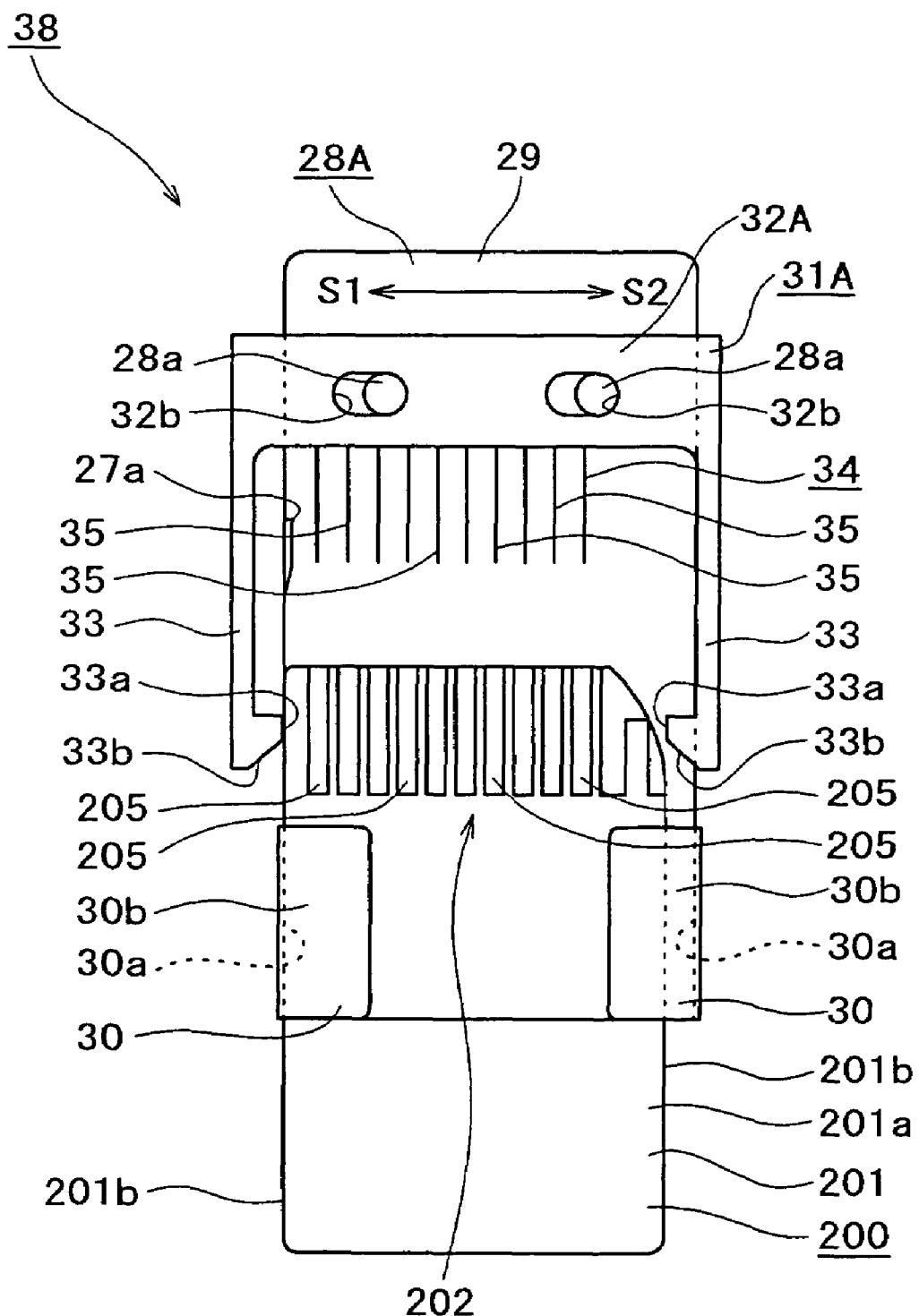
FIG. 24 is an enlarged plan view showing a condition where the second storage medium is inserted into a holder in a leftward deviated condition and the leading lever is next moved in a direction S1 according to the first modification.

When the first storage medium 100 is inserted into the slot 4 of the housing 2, the first storage medium 100 is inserted between the elastic portions 33 being elastically displaced similar to the case of the loading mechanism 37, and the terminal electrodes 105 are finally connected to the respective connection terminals 35 (see FIG. 23).

When the second storage medium 200 is inserted into the slot 4 of the housing 2 in the leftward deviated condition with respect to the slot 4, the second storage medium 200 comes into sliding contact with the inclined surface 33b of the left elastic portion 33 of the leading lever 31 and is further moved rearward. At this time, the holder 28A is moved in the direction S1 by a depression force of the second storage medium 200 to the inclined surface 33b of the left elastic portion 33 (see FIG. 24). Accordingly, the connection terminals 35 are displaced leftward, that is, in the direction S1.

Figure 25:
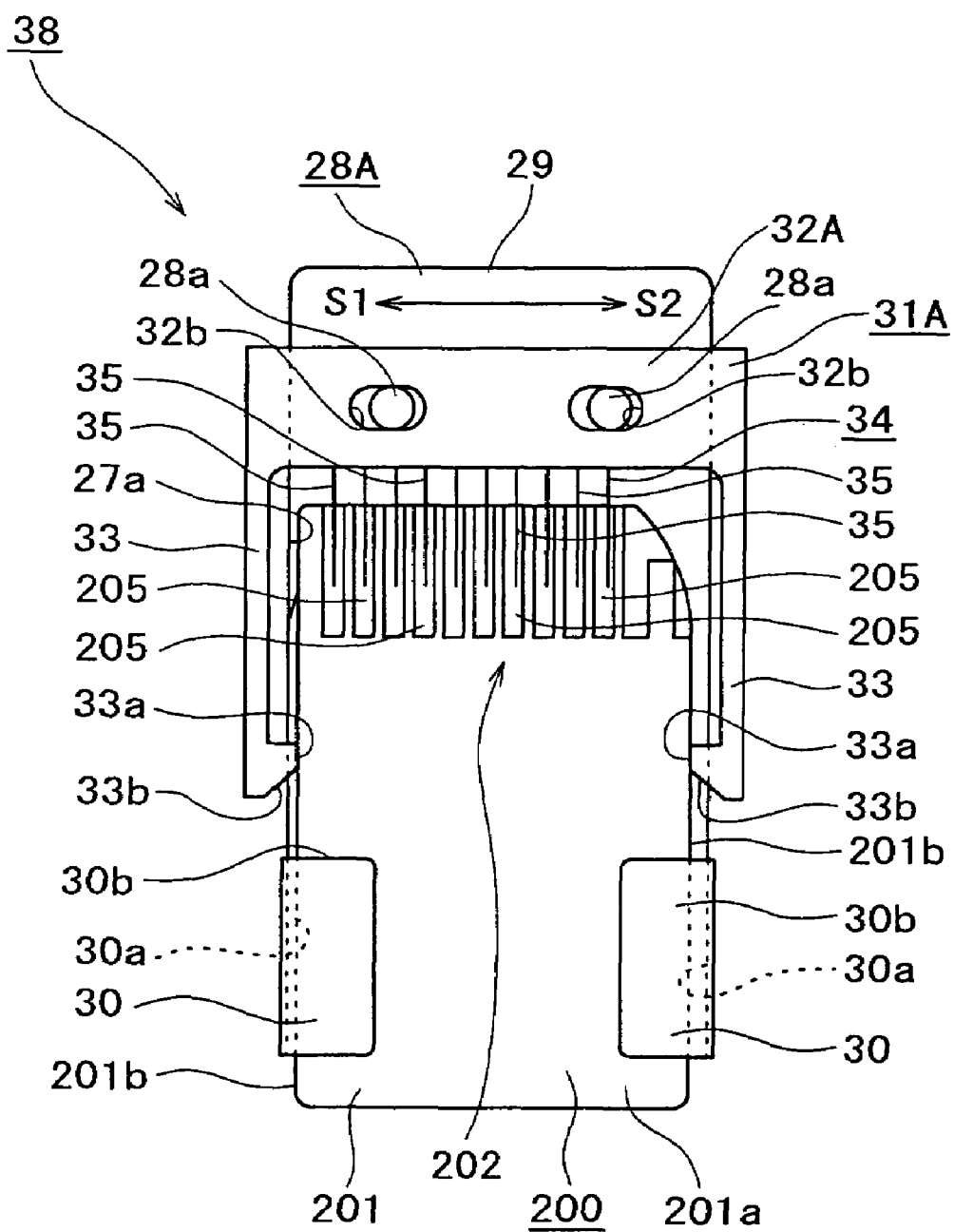
FIG. 25 is an enlarged plan view showing a condition where the second storage medium is mounted in the storage medium mounting portion, subsequent to the condition shown in FIG. 24.
Figure 26:
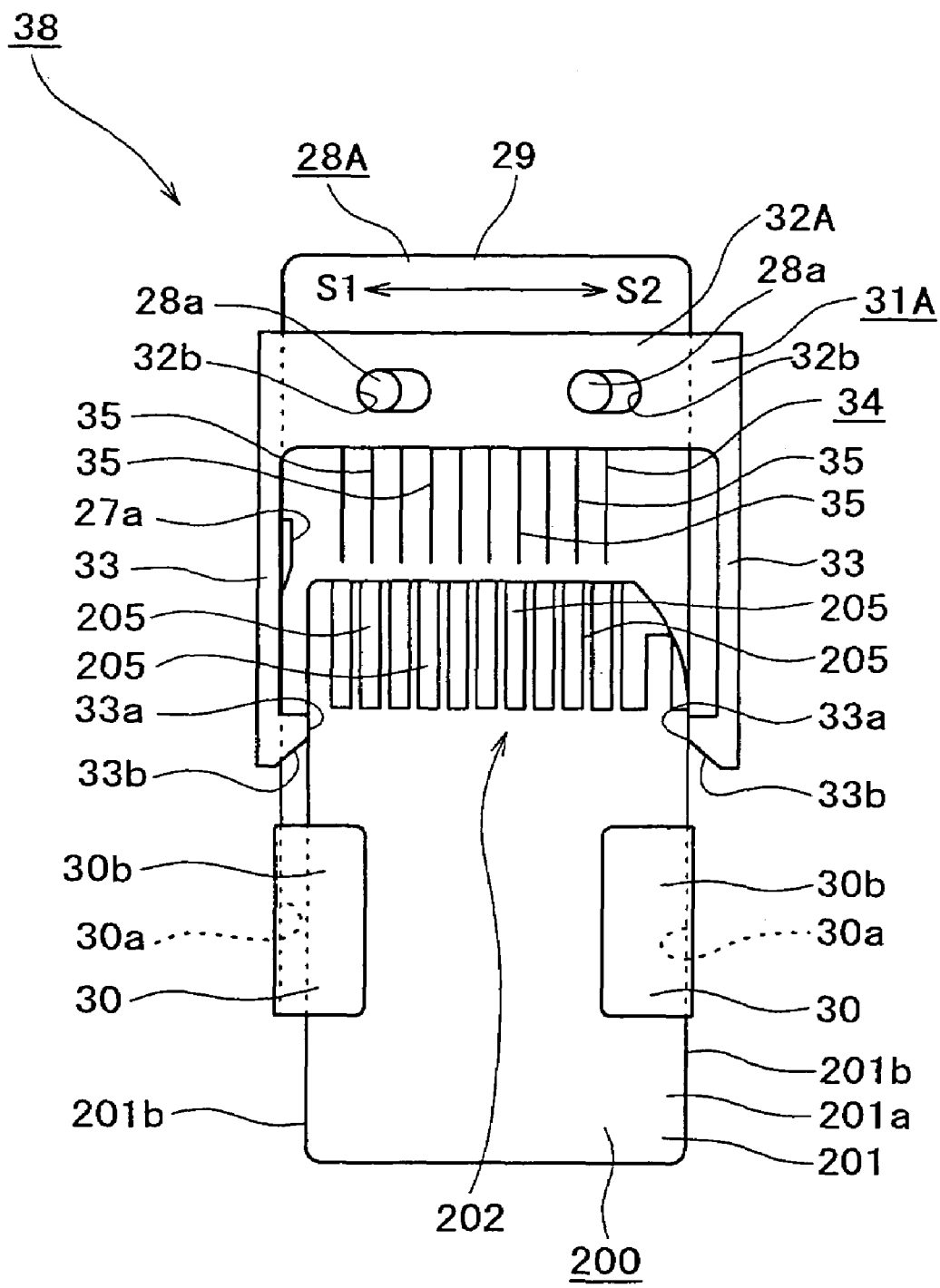
FIG. 26 is an enlarged plan view showing a condition where the second storage medium is inserted into the holder in a rightward deviated condition and the leading lever is next moved in a direction S2 according to the first modification.

The second storage medium 200 is further inserted between the elastic portions 33, and the terminal electrodes 205 finally come into connection with the connection terminals 35 displaced leftward by the lateral movement of the holder 28A in the direction S1 (see FIG. 25).

Conversely, when the second storage medium 200 is inserted into the slot 4 of the housing 2 in the rightward deviated condition with respect to the slot 4, the second storage medium 200 comes into sliding contact with the inclined surface 33b of the right elastic portion 33 of the leading lever 31 and is further moved rearward. At this time, the holder 28A is moved rightward in the direction S2 by a depression force of the second storage medium 200 to the inclined surface 33b of the right elastic portion 33 (see FIG. 26). Accordingly, the connection terminals 35 are displaced rightward, that is, in the direction S2.

Figure 27:
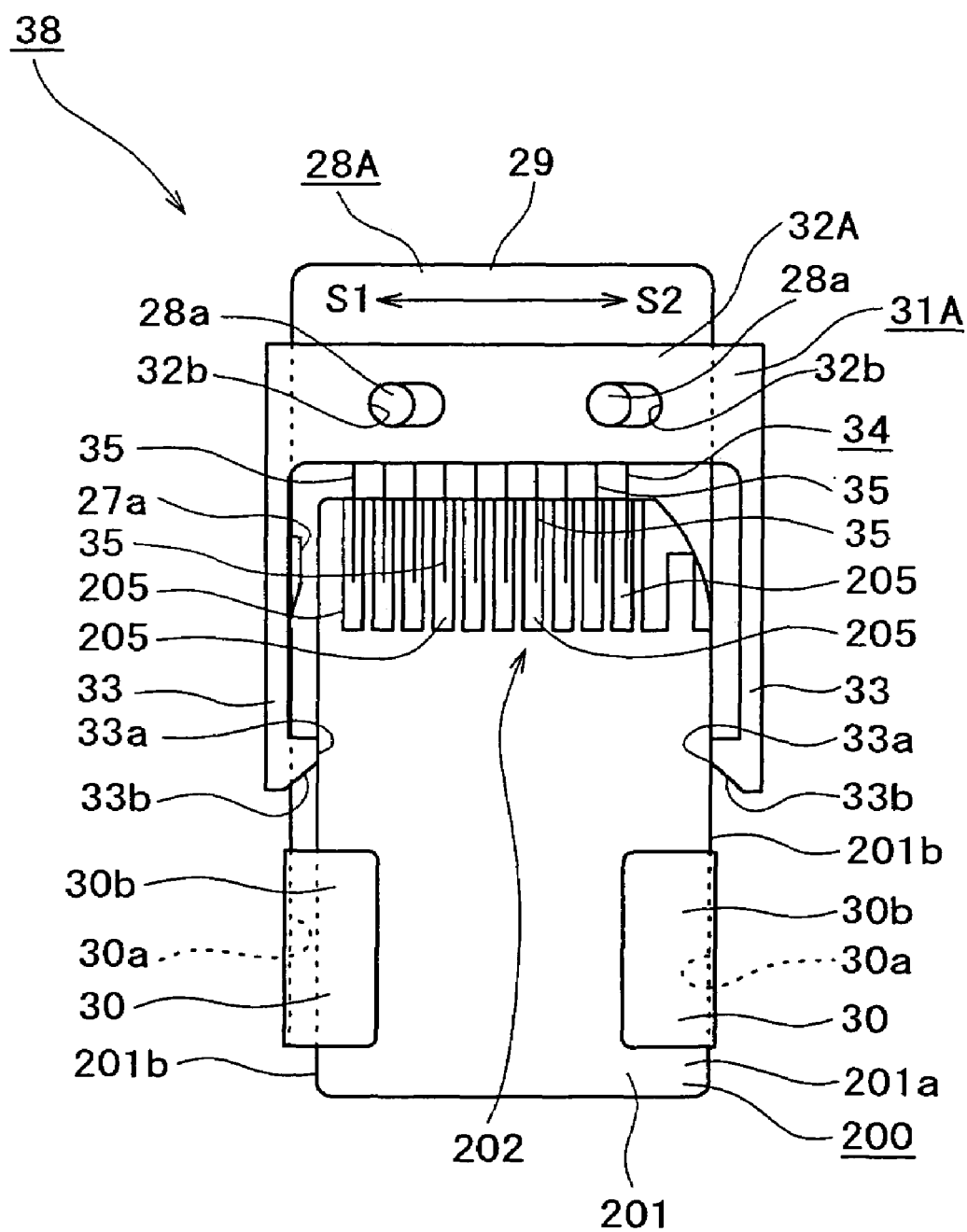
FIG. 27 is an enlarged plan view showing a condition where the second storage medium is mounted in the storage medium mounting portion, subsequent to the condition shown in FIG. 26.

The second storage medium 200 is further inserted between the elastic portions 33, and the terminal electrodes 205 finally come into connection with the connection terminals 35 displaced rightward by the lateral movement of the holder 28A in the direction S2 (see FIG. 27).

According to the loading mechanism 38, the leading lever 31A is movable in the direction of arrangement of the terminal electrodes 105 of the first storage medium 100 or the terminal electrodes 205 of the second storage medium 200 when the first storage medium 100 or the second storage medium 200 is inserted into the slot 4. Accordingly, the connection terminals 35 of the leading lever 31A can be reliably connected to the terminal electrodes 105 or 205.

Further, even when the second storage medium 200 is inserted into the slot 4 in the rightward or leftward deviated condition, the second storage medium 200 is always led by either of the right and left elastic portions 33, thereby ensuring reliable connection between the connection terminals 35 and the terminal electrodes 205.

Although not shown, a neutralizing spring for maintaining the leading lever 31A in its neutral position may be provided in the loading mechanism 38.

There will now be described a leading lever 31B as a second modification of the leading lever 31 (see FIGS. 28 to 36). The leading lever 31B is different from the leading lever 31 only in the point that the leading lever 31B has only one elastic portion 33 pivotably supported to the holder 28, so this different configuration only will be described in detail and the description of the other configuration will be omitted herein with the same or like parts being denoted by the same reference numerals as those in the loading mechanism 37 mentioned above.

Figure 28:
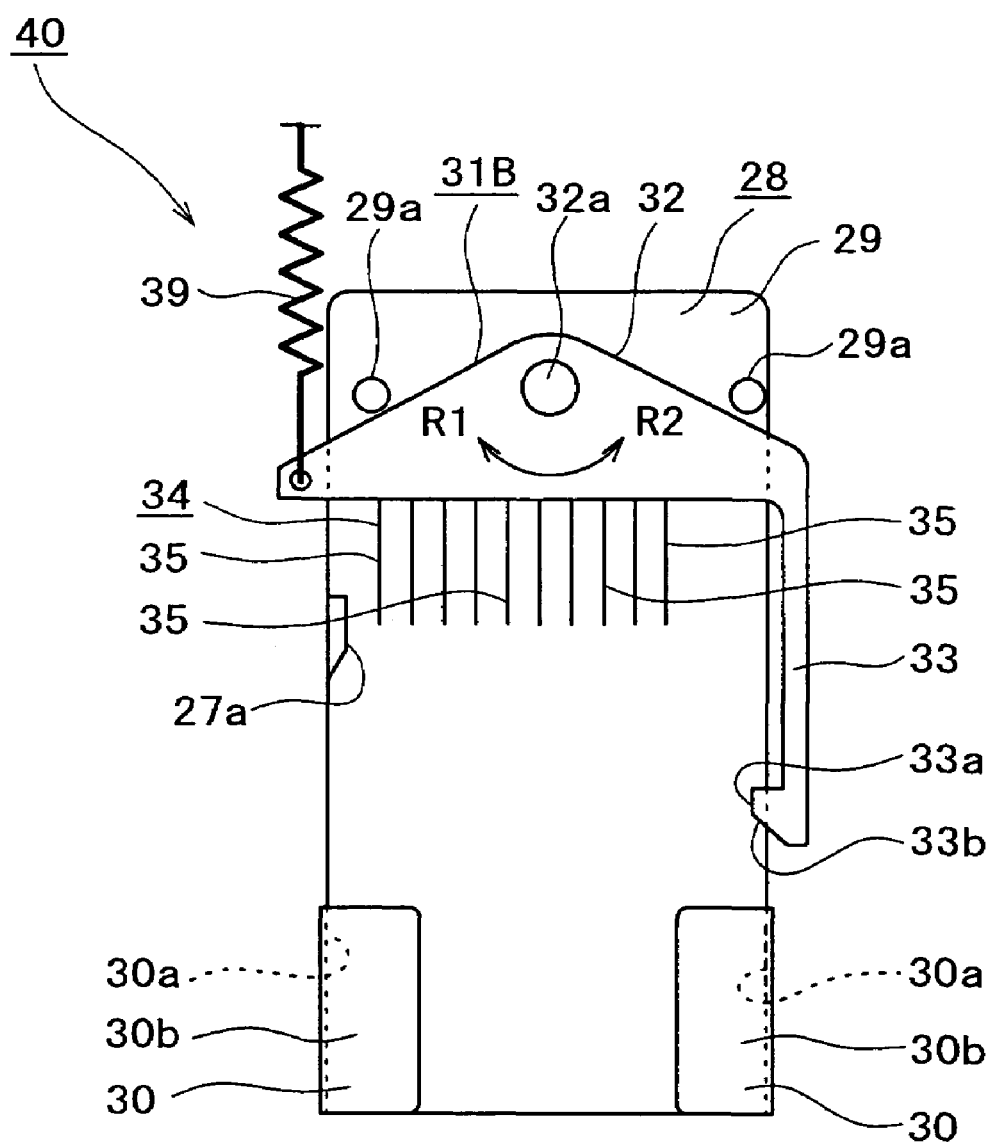
FIG. 28 is an enlarged plan view of a loading mechanism according to a second modification of the preferred embodiment together with FIG. 29 to FIG. 36.

The leading lever 31B is integrally formed with a base portion 32 and an elastic portion 33 projecting substantially frontward from any one of the right and left ends of the base portion 32, e.g., the right end thereof as shown (see FIG. 28).

The base portion 32 is pivotably supported through the pivot shaft 32a to the base portion 29 of the holder 28.

The leading lever 31B is biased in the direction R1 by an extension spring 39 connected between the base portion 32 and a spring support portion (not shown) provided in the storage medium mounting portion 27 (see FIG. 28). Accordingly, in the condition where no external force is applied to the leading lever 31B, the base portion 29 of the leading lever 31B is in abutment against the left restricting projection 29b formed on the base portion 29 of the holder 28, so that the pivotal movement of the leading lever 31B in the direction R1 is restricted by the left restricting projection 29b. In this condition where the pivotal movement of the leading lever 31B in the direction R1 is restricted, the front end of the inclined surface 33b of the elastic portion 33 falls at a position just behind or on the right side the inner surface of the vertical wall 30a of the guide portion 30 of the holder 28 (see FIG. 28).

The holder 28, the leading lever 31B, and the terminal portion 34 constitute a loading mechanism 40 for loading the first storage medium 100 or the second storage medium 200 into the storage medium mounting portion 27.

The operation of the loading mechanism 40 will now be described (see FIGS. 29 to 36).

Figure 29:
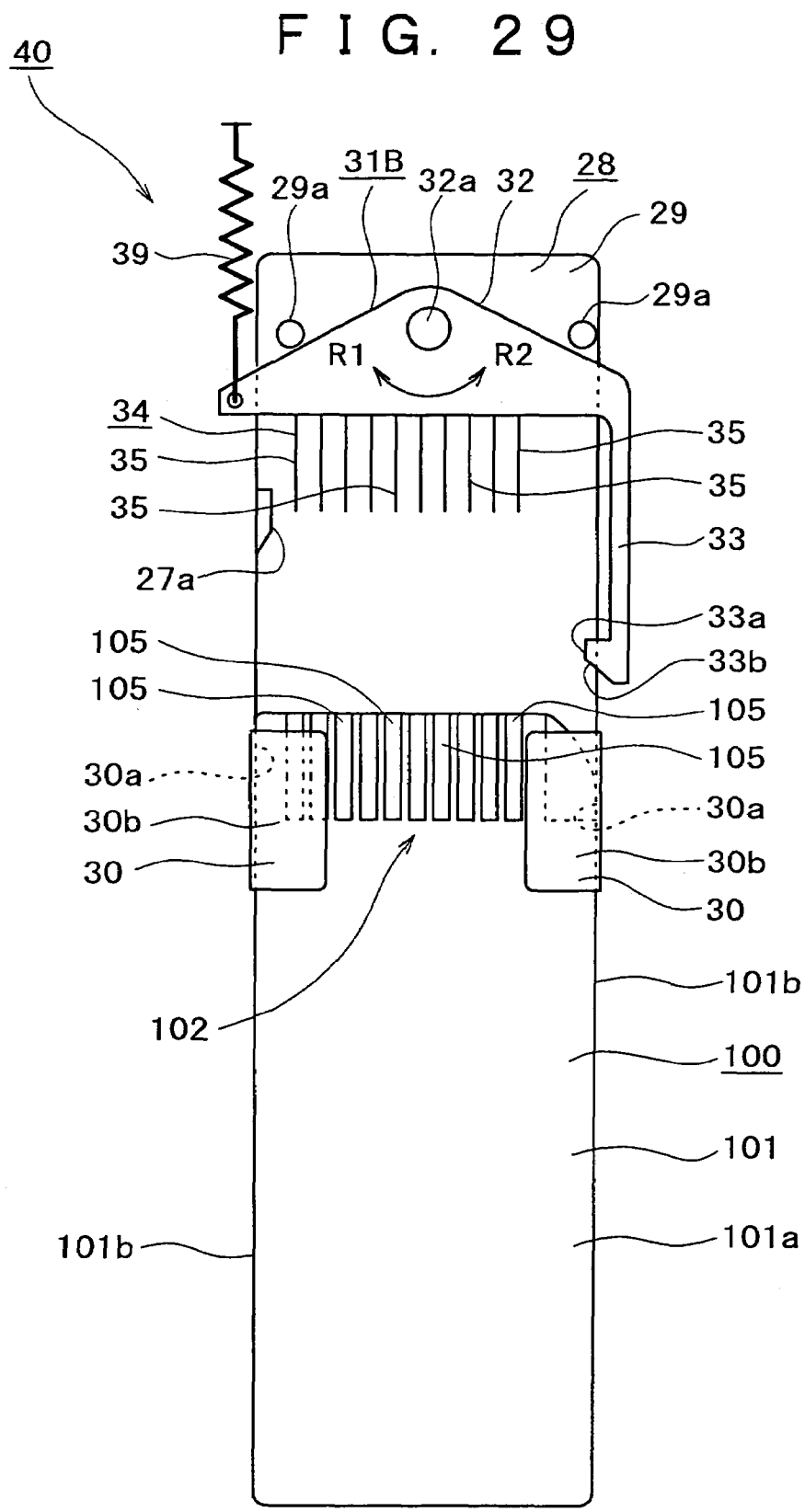
FIG. 29 is an enlarged plan view showing a condition just after the first storage medium is inserted into a holder.

When the first storage medium 100 is inserted into the slot 4, the opposite side surfaces 101b of the first storage medium 100 are guided by the vertical walls 30a of the guide portions 30 of the holder 28 during rearward movement into the storage medium drive unit 1 (see FIG. 29).

Figure 30:
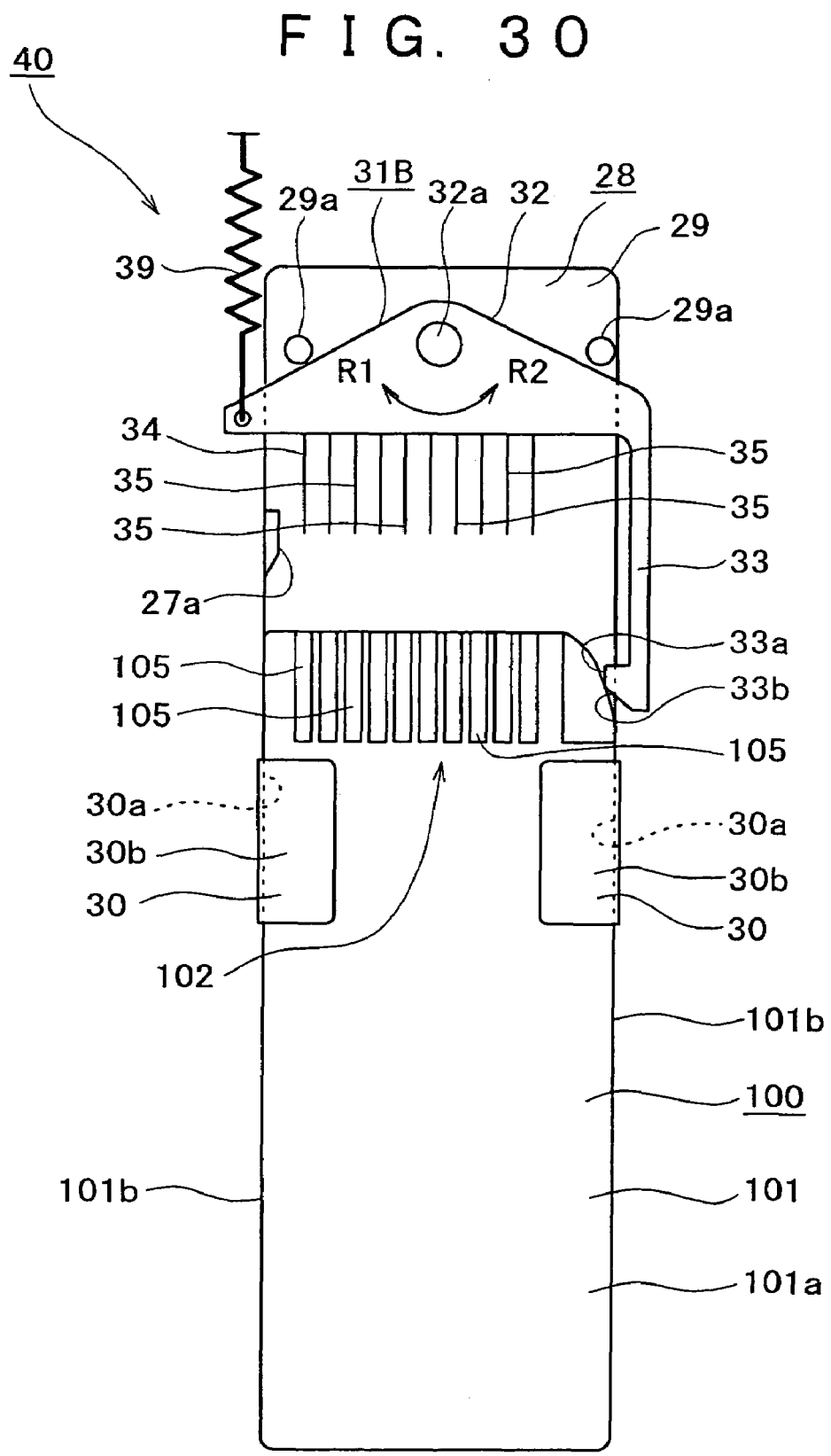
FIG. 30 is an enlarged plan view showing a condition where the first storage medium comes into sliding contact with an inclined surface of a leading lever.

During the rearward movement, the first storage medium 100 comes into sliding contact with the inclined surface 33b of the elastic portion 33 of the leading lever 31B (see FIG. 30). At this time, the leading lever 31B is pivotally moved in the direction R2 by a depression force of the first storage medium 100 to the inclined surface 33b against a biasing force of the extension spring 39 (see FIG. 31). Accordingly, the connection terminals 35 are displaced rightward.

Figure 31:
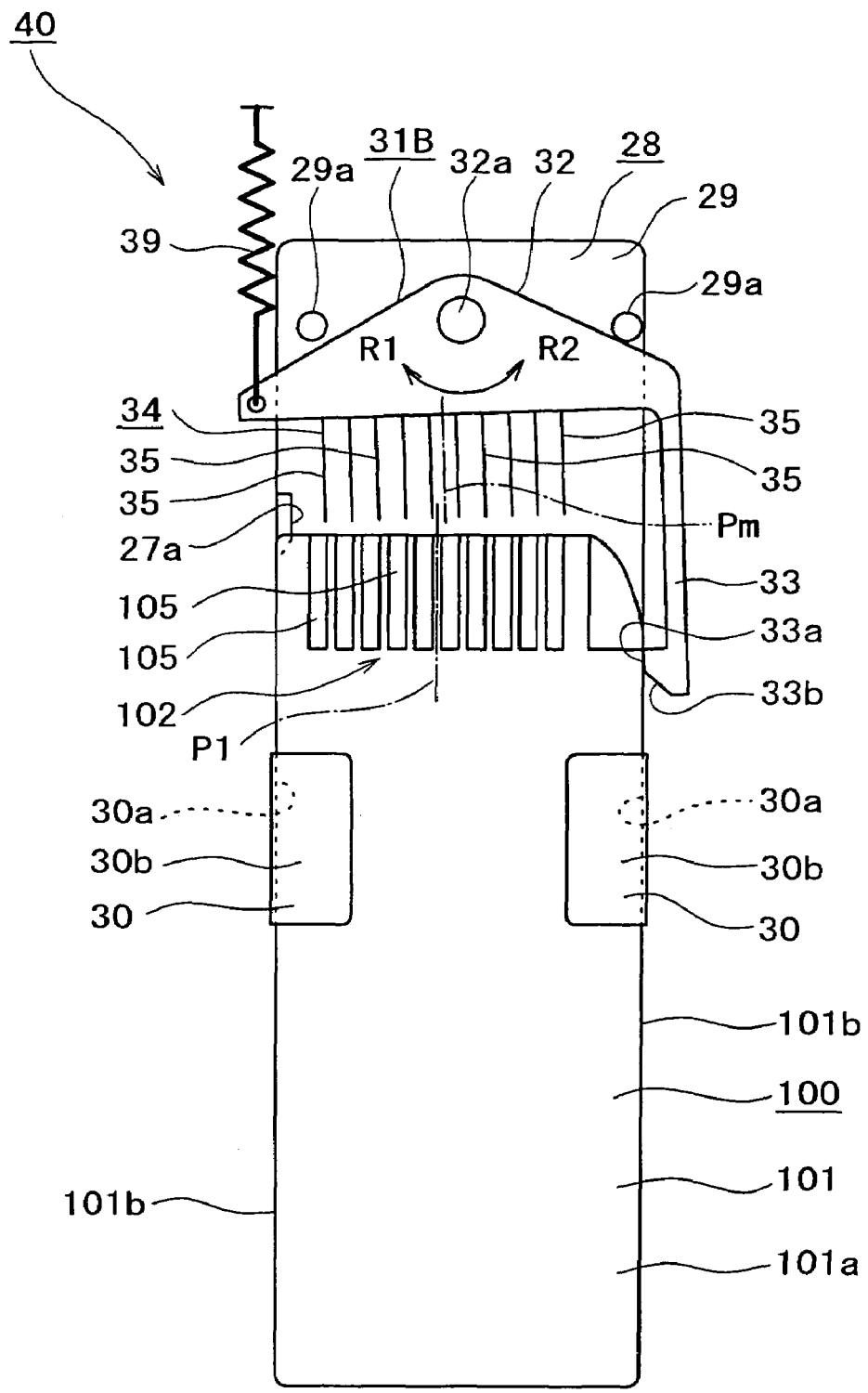
FIG. 31 is an enlarged plan view showing a condition where the leading lever is pivotally moved in a direction R2 against a biasing force of an extension spring, subsequent to the condition shown in FIG. 30.

At the end of the pivotal movement of the leading lever 31B in the direction R2, a center line Pm of the terminal portion 34 in its lateral direction is slightly deviated rightward from a center line P1 of the electrode portion 102 of the first storage medium 100 in its lateral direction (see FIG. 31).

Figure 32:
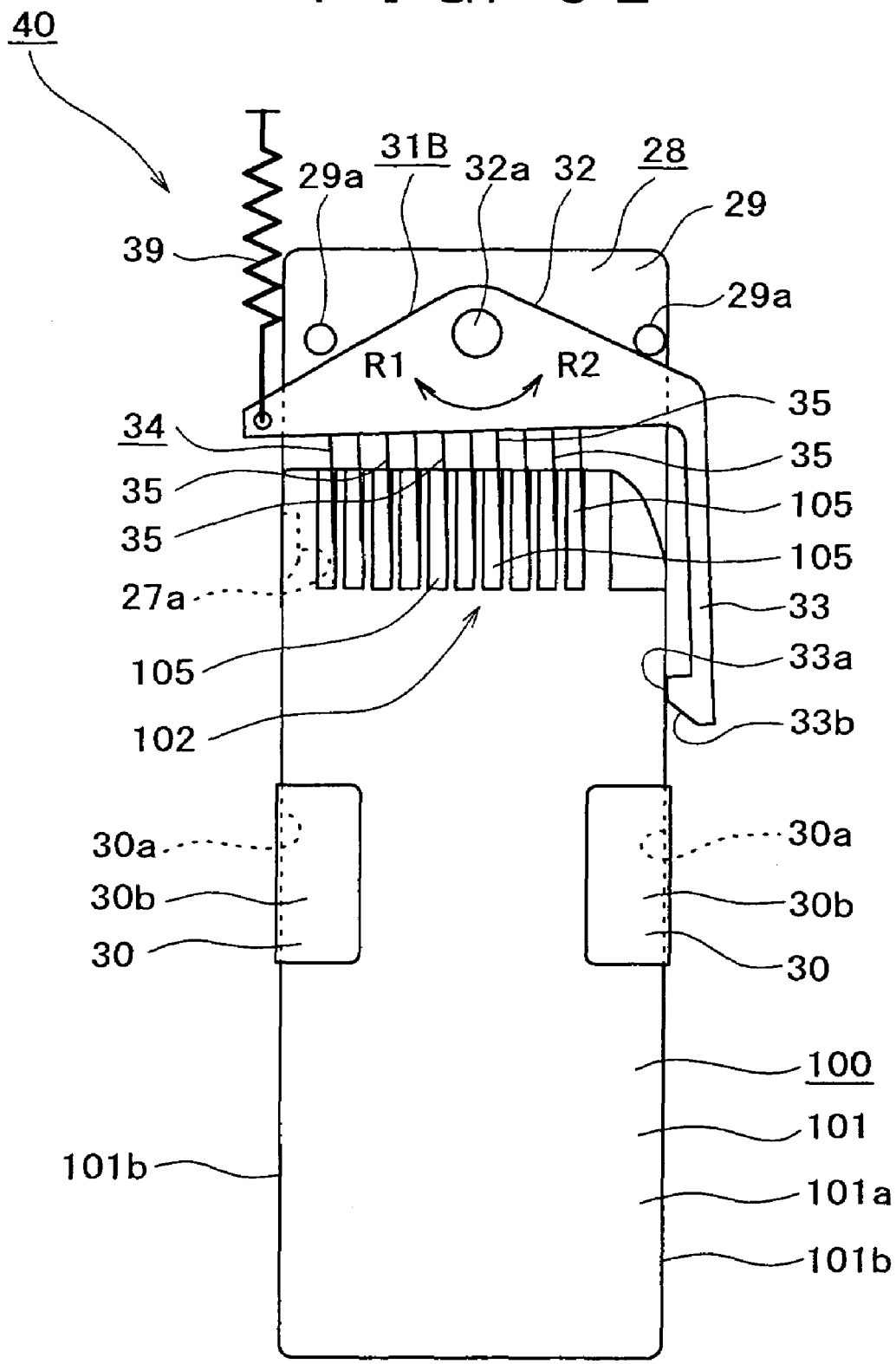
FIG. 32 is an enlarged plan view showing a condition where the first storage medium is mounted in the storage medium mounting portion, subsequent to the condition shown in FIG. 31.

When the first storage medium 100 is further moved rearward, the terminal electrodes 105 are brought into connection with the respective connection terminals 35 displaced rightward (see FIG. 32). At this time, the center line Pm of the terminal portion 34 in its lateral direction is slightly deviated rightward from the center line P1 of the electrode portion 102 of the first storage medium 100. However, since the width of each connection terminal 35 in the lateral direction is smaller than the width of each terminal electrode 105 in the lateral direction, the deviation between the center line Pm and the center line P1 can be absorbed by the difference in width between each connection terminal 35 and each terminal electrode 105. Accordingly, the terminal electrodes 105 can be properly connected to the respective connection terminals 35.

In the condition where the terminal electrodes 105 are connected with the respective connection terminals 35, the engagement projection 27a is engaged with the engagement groove 111 of the first storage medium 100 (see FIG. 32).

Figure 33:
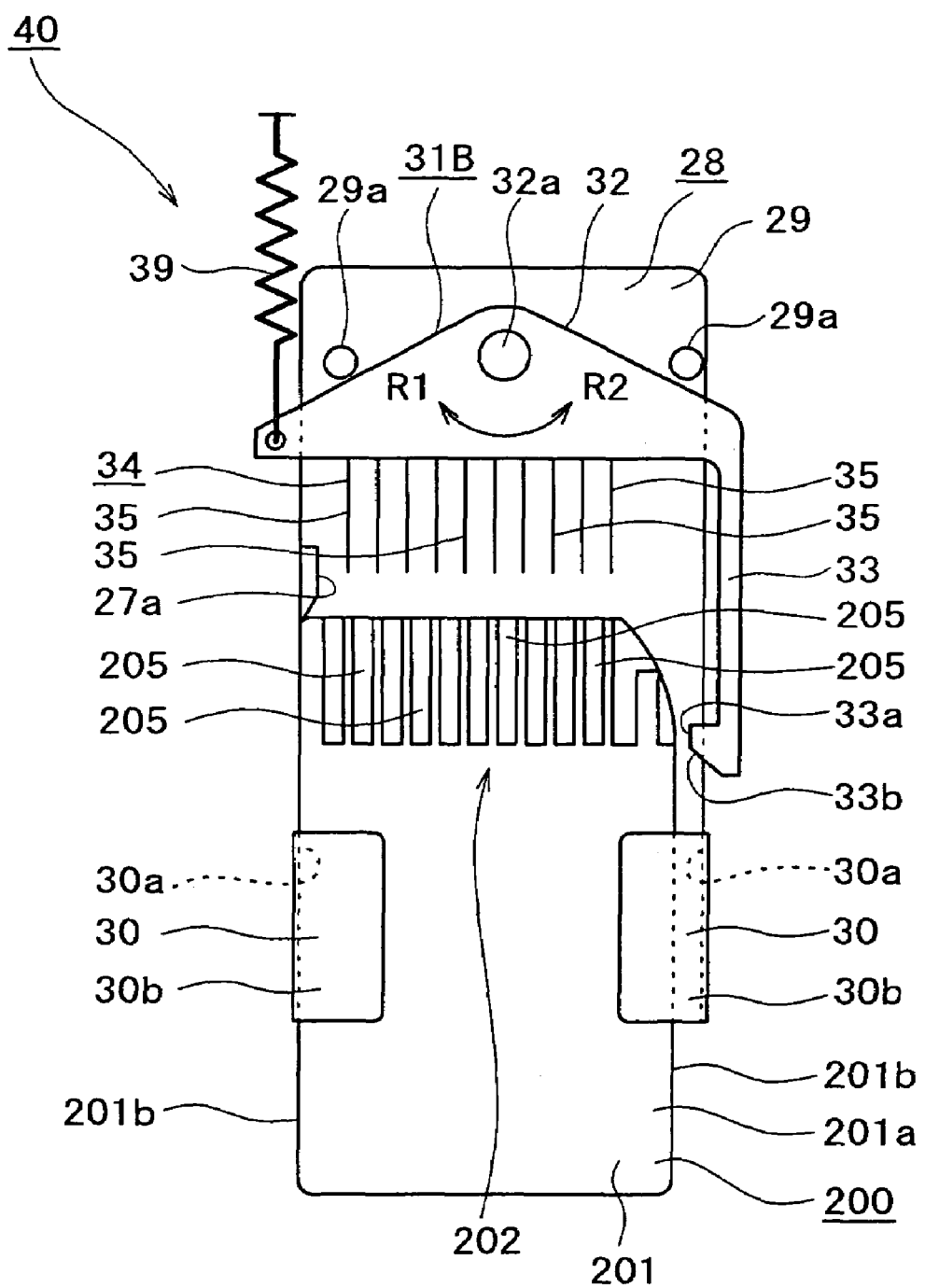
FIG. 33 is an enlarged plan view showing a condition where the second storage medium is inserted into the holder in a leftward deviated condition and is next moved rearward on the left side of an elastic portion of the leading lever.

When the second storage medium 200 is inserted into the slot 4 in the leftward deviated condition with respect to the slot 4, the second storage medium 200 is first moved rearward on the left side of the inclined surface 33b of the elastic portion 33, into the storage medium drive unit 1 (see FIG. 33).

Figure 34:
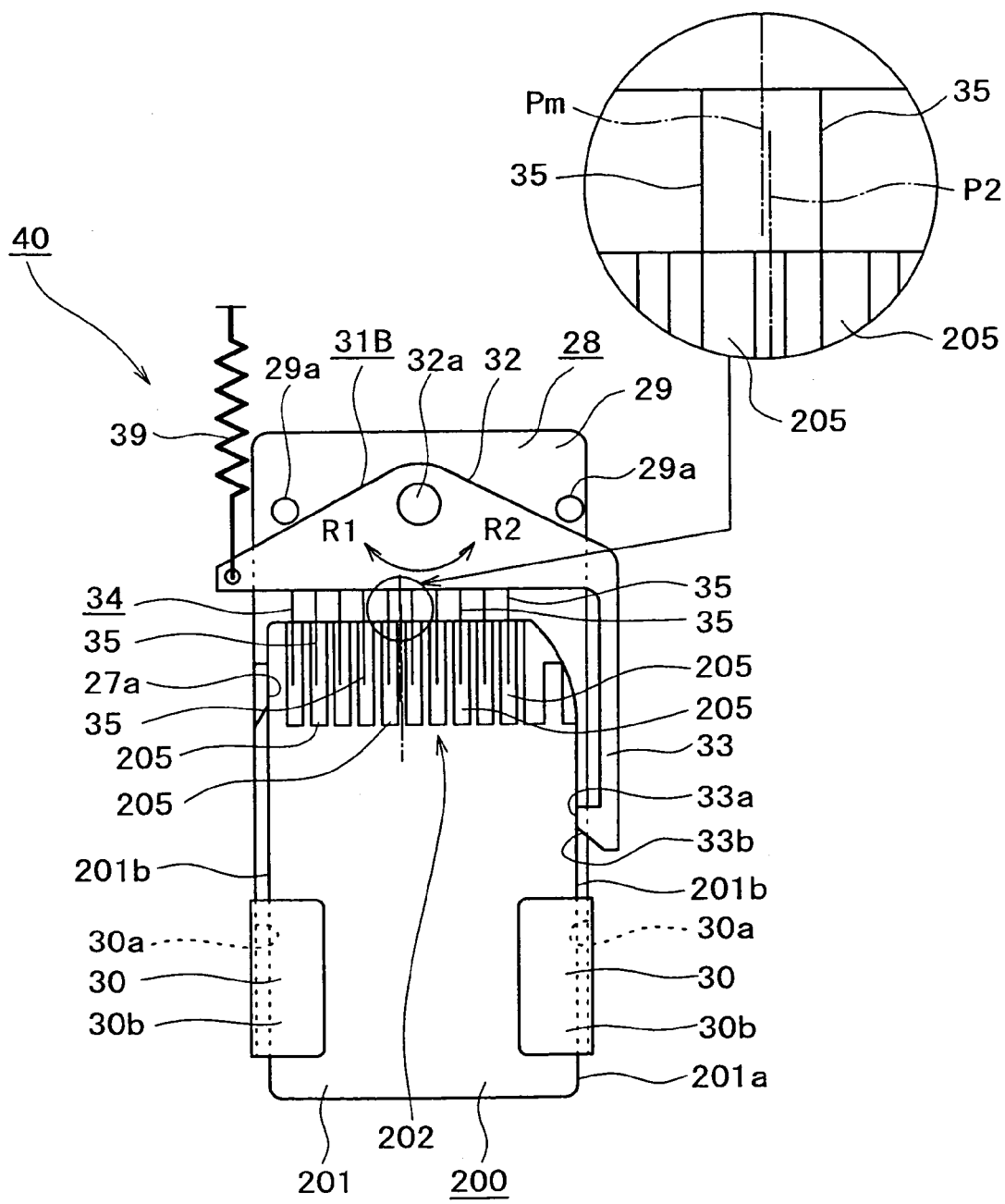
FIG. 34 is an enlarged plan view showing a condition where the second storage medium is mounted in the storage medium mounting portion, subsequent to the condition shown in FIG. 33.
Figure 35:
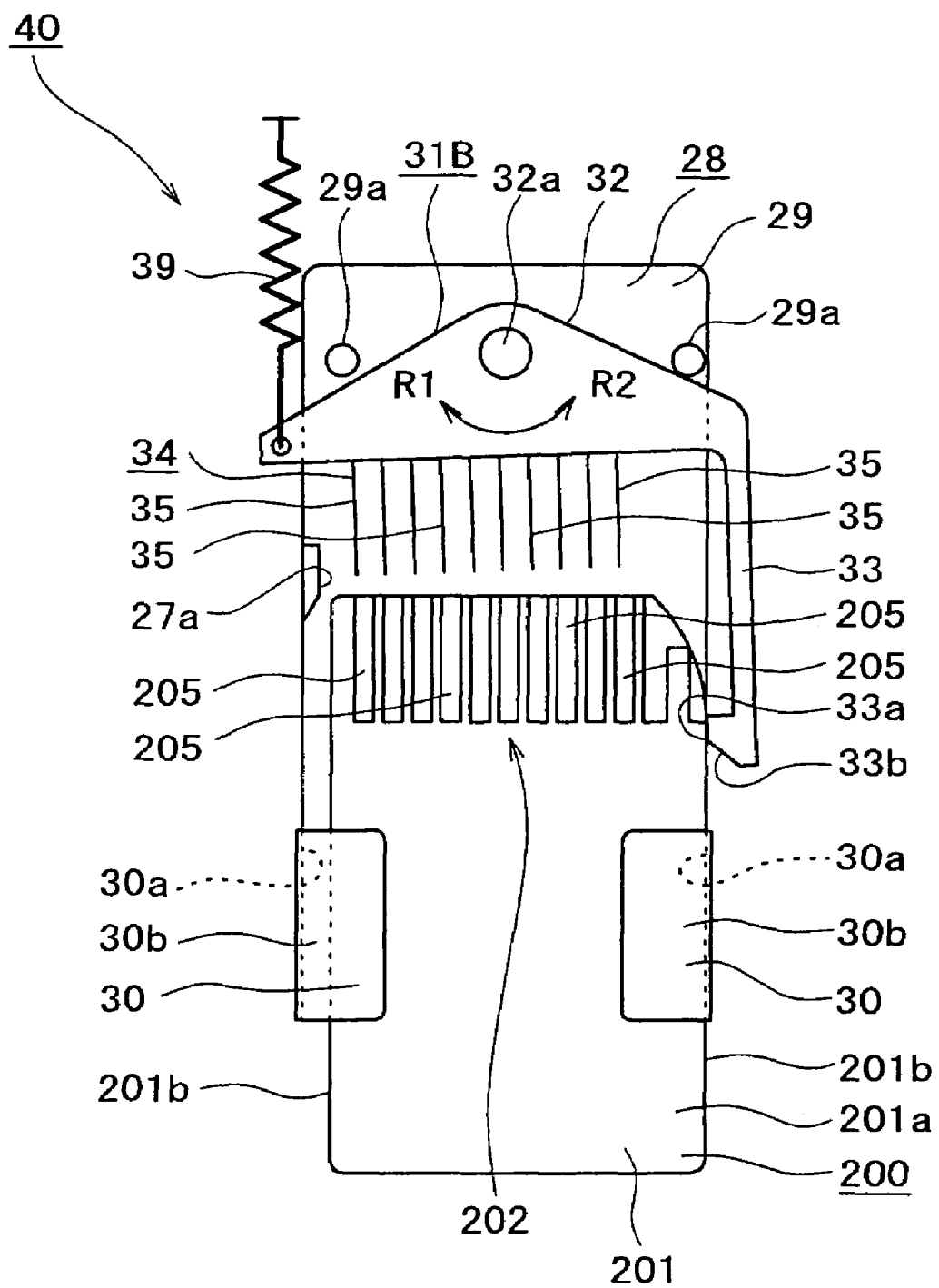
FIG. 35 is an enlarged plan view showing a condition where the second storage medium is inserted into the holder in a rightward deviated condition and the leading lever is next pivotally moved in a direction R2.

When the second storage medium 200 is further moved rearward, the second storage medium 200 comes into sliding contact with the engagement projection 27a because the second storage medium 200 is not formed with the engagement groove 111 adapted to engage with the engagement projection 27a, so that the second storage medium 200 is slightly shifted rightward, and the terminal electrodes 205 are brought into connection with the respective connection terminals 35 (see FIG. 34). At this time, the center line Pm of the terminal portion 34 in its lateral direction is slightly deviated leftward from a center line P2 of the electrode portion 202 of the second storage medium 200 in its lateral direction. However, since the width of each connection terminal 35 in the lateral direction is smaller than the width of each terminal electrode 205 in the lateral direction, the deviation between the center line Pm and the center line P2 can be absorbed by the difference in width between each connection terminal 35 and each terminal electrode 205.

Accordingly, the terminal electrodes 205 can be properly connected to the respective connection terminals 35.

Conversely, when the second storage medium 200 is inserted into the slot 4 in the rightward deviated condition with respect to the slot 4, the second storage medium 200 comes into sliding contact with the inclined surface 33b of the elastic portion 33 of the leading lever 31B.

The second storage medium 200 is moved rearward in sliding contact with the inclined surface 33b into the storage medium drive unit 1. At this time, the leading lever 31B is pivotally moved in the direction R2 by a depression force of the second storage medium 200 to the inclined surface 33b (see FIG. 35). Accordingly, the connection terminals 35 are displaced rightward.

Figure 36:
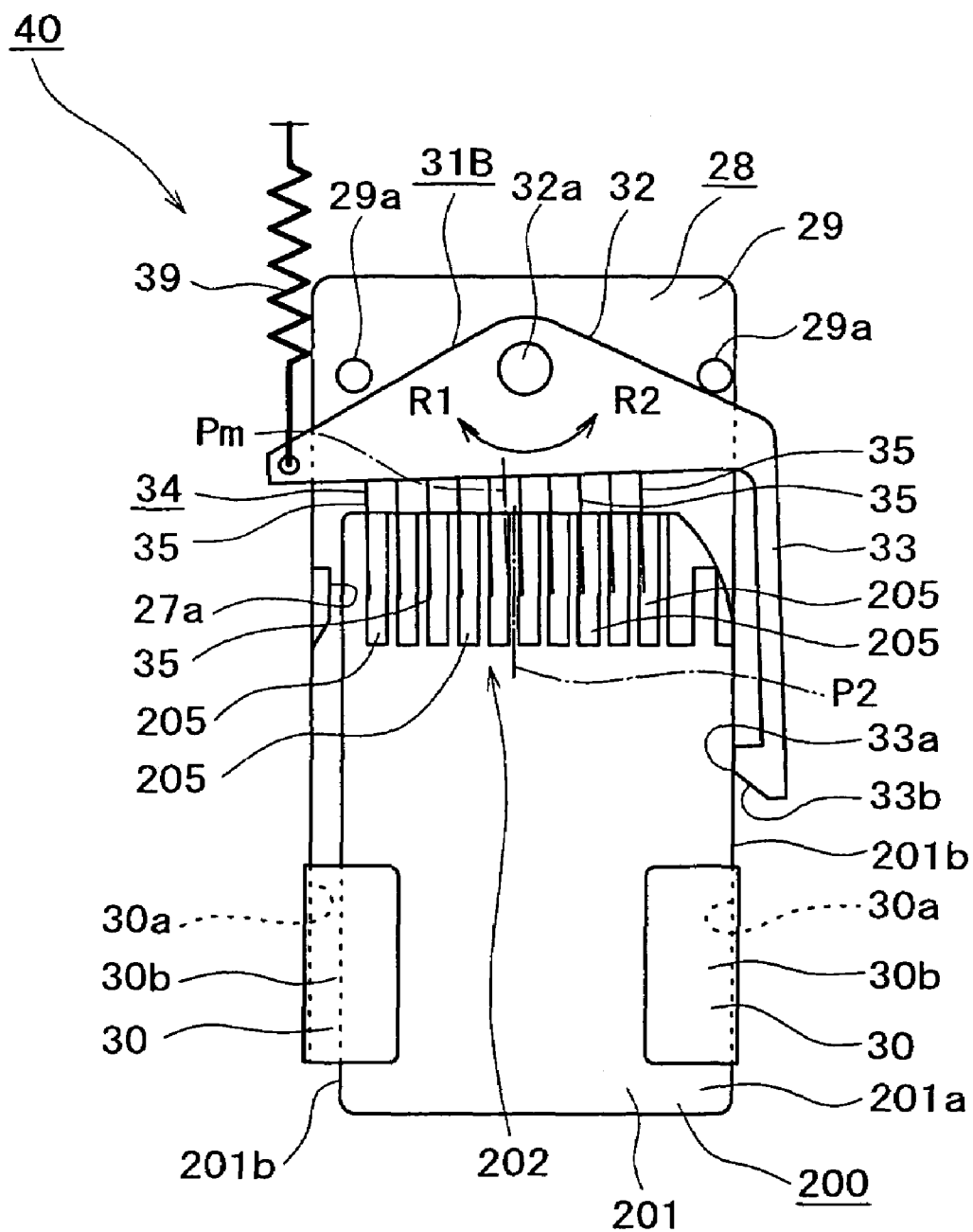
FIG. 36 is an enlarged plan view showing a condition where the second storage medium is mounted in the storage medium mounting portion, subsequent to the condition shown in FIG. 35.

When the second storage medium 200 is further moved rearward, the terminal electrodes 205 come into connection with the respective connection terminals 35 displaced rightward (see FIG. 36). At this time, the center line Pm of the terminal portion 34 in its lateral direction is slightly deviated leftward from the center line P2 of the electrode portion 202 of the second storage medium 200 in its lateral direction. However, since the width of each connection terminal 35 in the lateral direction is smaller than the width of each terminal electrode 205 in the lateral direction, the deviation between the center line Pm and the center line P2 can be absorbed by the difference in width between each connection terminal 35 and each terminal electrode 205. Accordingly, the terminal electrodes 205 can be properly connected to the respective connection terminals 35.

According to the loading mechanism 40, the leading lever 31B is composed of the base portion 32 and the single elastic portion 33, so that the mechanism can be further simplified.

While the elastic portion 33 of the leading lever 31B is elastically displaceable relative to the base portion 32, the elastic portion 33 may be replaced by a nonelastic portion undisplaceable relative to the base portion 32.

Figure 37:
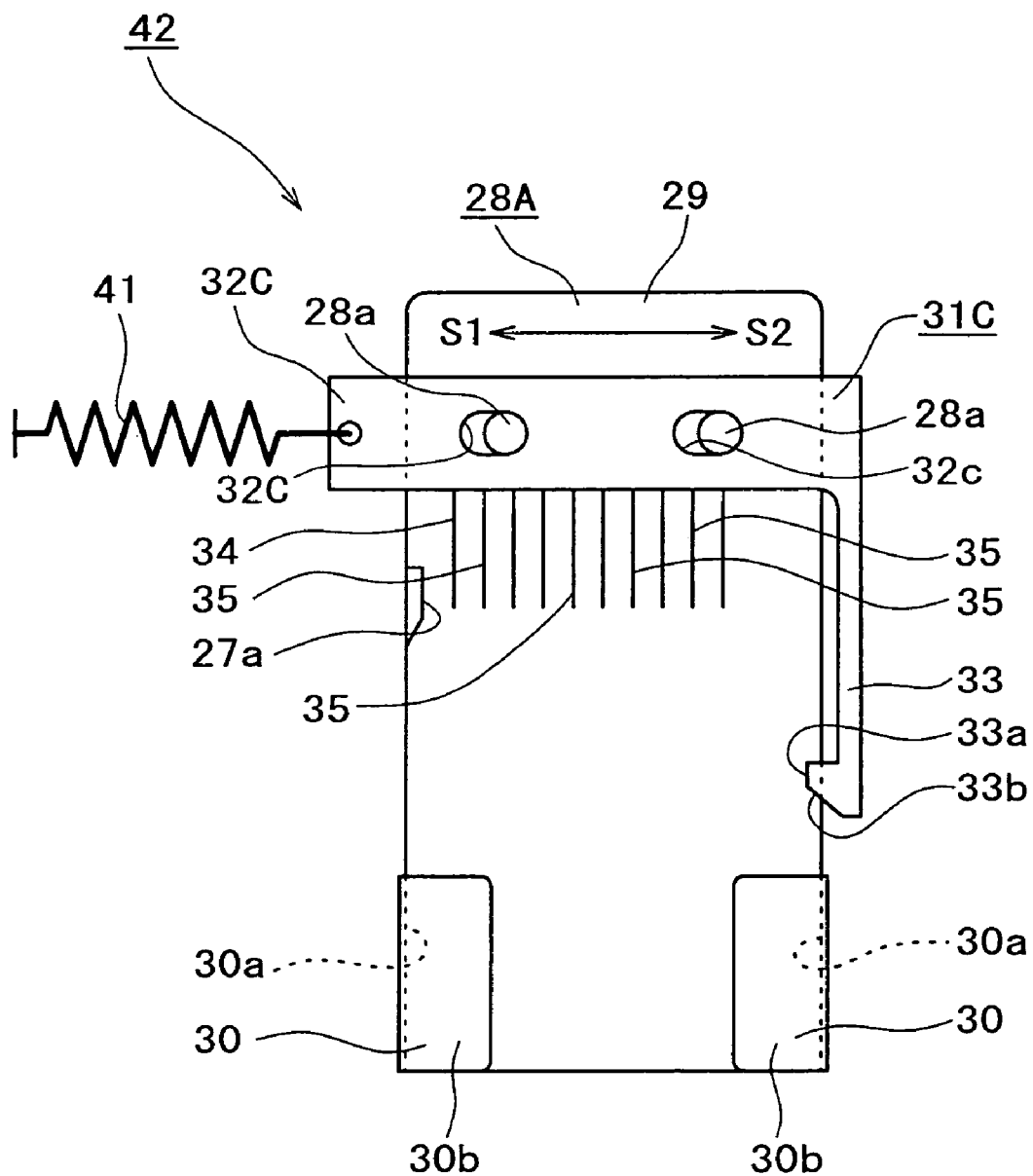
FIG. 37 is an enlarged plan view of a loading mechanism according to a third modification of the preferred embodiment.

While the leading lever 31B pivotably supported to the holder 28 has been described as the second modification of the leading lever 31, the leading lever 31B may be replaced by a leading lever 31C laterally movably supported to the holder 28 like the leading lever 31A mentioned previously as a third modification (see FIG. 37).

The leading lever 31C is integrally formed with a base portion 32C and an elastic portion 33 projecting substantially frontward from any one of the right and left ends of the base portion 32C, e.g., the right end thereof as shown. The base portion 32C is formed with a pair of laterally elongated holes 32c laterally spaced apart from each other. A pair of support pins 28a of a holder 28A are inserted in the elongated holes 32c of the leading lever 31C so that the leading lever 31C is laterally movably supported to the holder 28A. A terminal portion 34 is provided on the front surface of the base portion 32C of the leading lever 31C.

The leading lever 31C is biased in the direction S1 by an extension spring 41 connected between the base portion 32C and a spring support portion (not shown) provided in the storage medium mounting portion 27. Accordingly, in the condition where no external force is applied to the leading lever 31C, the base portion 32C is kept in its left position.

The holder 28A, the leading lever 31C, and the terminal portion 34 constitute a loading mechanism 42 for loading the first storage medium 100 or the second storage medium 200 into the storage medium mounting portion 27.

The operation of the loading mechanism 42 is similar to that of the loading mechanism 40 in such a manner that the pivotal movement of the leading lever 31B in the opposite directions R1-R2 is replaced by the lateral movement of the leading lever 31C in the opposite directions S1-S2, so the detailed description of the operation will be omitted herein.

According to the loading mechanism 42, the leading lever 31C is composed of the base portion 32C and the single elastic portion 33, so that the mechanism can be further simplified. Further, the terminal portion 34 fixed to the leading lever 31C is movable in the direction of arrangement of the terminal electrodes 105 or 205, so that the terminal electrodes 105 or 205 can be reliably connected to the respective connection terminals 35.

It should be noted that the shape and structure of each part described in the above preferred embodiment and each modification are merely illustrative and that the description thereof is not to be construed as limiting the scope of the present invention.

INDUSTRIAL APPLICABILITY

The loading mechanism of the present invention can selectively load a plurality of storage media different in size without using any adapter and can improve the usability by commonly using the slot for insertion of these storage media.

Further, the loading mechanism of the present invention does not require any detecting means for detecting the difference in size between the storage media selectively inserted into the slot and also does not require any respective guides for the storage media. Accordingly, the mechanism can be simplified to thereby reduce a manufacturing cost of the loading mechanism.

The storage medium drive unit of the present invention can selectively load a plurality of storage media different in size without using any adapter and can improve the usability by commonly using the slot for insertion of these storage media.

Further, the storage medium drive unit of the present invention does not require any detecting means for detecting the difference in size between the storage media selectively inserted into the slot and also does not require any respective guides for the storage media. Accordingly, the mechanism can be simplified to thereby reduce a manufacturing cost of the storage medium drive unit.

The invention claimed is:

1. A loading device for a platelike storage medium incorporating a semiconductor memory and having at least a plurality of terminals, comprising:
   a terminal portion having a plurality of connection terminals adapted to be connected to said terminals of said storage medium, said terminal portion being movable in a direction so that said terminals of said storage medium come into connection with said connection terminals of said terminal portion in loading said storage medium;
   a leading portion configured to lead said storage medium and said terminal portion in said direction so that said terminals of said storage medium come into connection with said connection terminals of said terminal portion in loading said storage medium; and
   a leading member having said terminal portion and said leading portion, and a holder configured to movably support said leading member,
   wherein said leading member has a base portion from which said terminal portion projects, and said leading portion comprises a pair of elastically displaceable portions projecting from said base portion and adapted to come into contact with the opposite side surfaces of said storage medium.

2. The loading device according to claim 1, wherein said storage medium is selected from a first storage medium incorporating a semiconductor memory and having a plurality of terminals and a second storage medium incorporating a semiconductor memory and having a plurality of terminals, said second storage medium being smaller in size than said first storage medium; and the space between said elastically displaceable portions is smaller than the width of said first storage medium and substantially equal to the width of said second storage medium.

3. The loading device according to claim 2, wherein each of said connection terminals of said terminal portion is formed from an elastically displaceable member having conductivity, and the width of each connection terminal is smaller than the width of each of said terminals of said storage medium.

4. The loading device according to claim 3, wherein said leading member is pivotably supported to said holder.

5. The loading device according to claim 4, wherein said holder has a restricting portion configured to restrict pivotal movement of said leading member.

6. The loading device according to claim 5, further comprising a spring configured to maintain said leading member in its neutral position.

7. The loading device according to claim 3, wherein said leading member is supported to said holder so as to be movable in a direction substantially perpendicular to the direction of loading said storage medium.

8. The loading device according to claim 3, wherein said elastically displaceable portions are integrated with said base portion so as to project from the opposite ends of said base portion, and said terminal portion is located between said elastically displaceable portions.

9. The loading device according to claim 2, wherein said holder further has an engaging portion configured to engage one of the opposite side surfaces of said second storage member.

10. A reading and/or writing device for a platelike storage medium incorporating a semiconductor memory and having at least a plurality of terminals, comprising:
  a terminal portion having a plurality of connection terminals adapted to be connected to said terminals of said storage medium, said terminal portion being movable in a direction so that said terminals of said storage medium come into connection with said connection terminals of said storage medium in loading said storage medium;
  a leading portion configured to lead said storage medium and said terminal portion in said direction so that said terminals of said storage medium come into connection with said connection terminals of said terminal portion in loading said storage medium;
  a processing portion configured to read or write data from/to said semiconductor memory of said storage medium through said terminal portion connected to said terminals of said storage medium; and
  a leading member having said terminal portion and said leading portion, and a holder configured to movably support said leading member,
  wherein said leading member has a base portion from which said terminal portion projects, and said leading portion comprises a pair of elastically displaceable portions projecting from said base portion and adapted to come into contact with the opposite side surfaces of said storage medium.

11. The reading and/or writing device according to claim 10, wherein said storage medium is selected from a first storage medium incorporating a semiconductor memory and having a plurality of terminals and a second storage medium incorporating a semiconductor memory and having a plurality of terminals, said second storage medium being smaller in size than said first storage medium; and the space between said elastically displaceable portions is smaller than the width of said first storage medium and substantially equal to the width of said second storage medium.

12. The reading and/or writing device according to claim 11, wherein each of said connection terminals of said terminal portion is formed from an elastically displaceable member having conductivity, and the width of each connection terminal is smaller than the width of each of said terminals of said storage medium.

13. The reading and/or writing device according to claim 12, wherein said leading member is pivotably supported to said holder.

14. The reading and/or writing device according to claim 13, wherein said holder has a restricting portion configured to restrict pivotal movement of said leading member.

15. The reading and/or writing device according to claim 14, wherein said loading device further comprises a spring configured to maintain said leading member in its neutral position.

16. The reading and/or writing device according to claim 12, wherein said leading member is supported to said holder so as to be movable in a direction substantially perpendicular to the direction of loading said storage medium.

17. The reading and/or writing device according to claim 12, wherein said elastically displaceable portions are integrated with said base portion so as to project from the opposite ends of said base portion, and said terminal portion is located between said elastically displaceable portions.

18. The reading and/or writing device according to claim 11, wherein said holder further has an engaging portion configured to engage one of the opposite side surfaces of said second storage member.

19. The reading and/or writing device according to claim 11, wherein said processing portion determines whether said storage medium loaded in the condition where said terminals of said storage medium are connected with said connection terminals of said terminal portion is said first storage medium or said second storage medium.

* * * * *